(12) United States Patent
Hara et al.

(10) Patent No.: US 11,014,422 B2
(45) Date of Patent: May 25, 2021

(54) LEANING VEHICLE

(71) Applicant: YAMAHA HATSUDOKI KABUSHIKI KAISHA, Iwata (JP)

(72) Inventors: Nobuo Hara, Iwata (JP); Yukihide Fukuhara, Iwata (JP); Takeshi Toyota, Iwata (JP); Tatsuya Nagata, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 291 days.

(21) Appl. No.: 15/984,019

(22) Filed: May 18, 2018

(65) Prior Publication Data

US 2018/0264906 A1 Sep. 20, 2018

Related U.S. Application Data

(63) Continuation-in-part of application No. PCT/JP2016/083978, filed on Nov. 16, 2016.

(30) Foreign Application Priority Data

Nov. 20, 2015 (JP) .............................. JP2015-227878

(51) Int. Cl.
*B60G 17/016* (2006.01)
*B62K 5/10* (2013.01)
(Continued)

(52) U.S. Cl.
CPC ....... *B60G 17/0162* (2013.01); *B60G 17/015* (2013.01); *B62J 99/00* (2013.01);
(Continued)

(58) Field of Classification Search
CPC .. B60G 17/0162; B60G 17/015; B60G 13/08; B60G 21/073; B60G 2300/122;
(Continued)

(56) References Cited

U.S. PATENT DOCUMENTS 5,639,119 A * 6/1997 Plate ...................... B62D 49/08
280/754
5,813,697 A * 9/1998 Bargenquast ............ B60G 9/02
280/6.154
(Continued)

FOREIGN PATENT DOCUMENTS

CA 2943765 A1 10/2015
EP 0796193 A1 9/1997
(Continued)

OTHER PUBLICATIONS

Robin Hibbard and Dean Karnopp, "Methods of Cotrolling the Lean Angle of Tilting Vehicles", Advanced Automotive Technologies 1993, the U.S, ASME, 1993, vol. 52, pp. 311-320, ISBN: 0-7918-1046-1.

(Continued)

*Primary Examiner* — Bhavesh V Amin
(74) *Attorney, Agent, or Firm* — Rabin & Berdo, P.C.

(57) ABSTRACT

A leaning vehicle includes a body frame, a right wheel and a left wheel, a linkage mechanism including arms rotatably supported on the body frame, buffer devices, a left-right tilt angle control mechanism configured to control a tilt angle of the body frame by adjusting a rotation of the arms with respect to the body frame, a buffer control mechanism configured to suppress motion of the buffer devices, and a control section. The control section determines whether to cause the left-right tilt angle control mechanism to perform roll angle control during traveling toward stop, and performs control of causing the buffer control mechanism to suppress motion of the buffer devices in a period in which the vehicle speed is in at least a part of a low-speed traveling range and in at least a part of a period in which the left-right tilt angle control mechanism.

13 Claims, 12 Drawing Sheets

(51) Int. Cl.
  *B62J 99/00* (2020.01)
  *B60G 17/015* (2006.01)
  *B62K 25/08* (2006.01)
  *B62K 5/027* (2013.01)
  *B62K 5/05* (2013.01)
  *B62K 5/08* (2006.01)
  *G05D 1/08* (2006.01)

(52) U.S. Cl.
  CPC .............. *B62K 5/027* (2013.01); *B62K 5/05* (2013.01); *B62K 5/08* (2013.01); *B62K 5/10* (2013.01); *B62K 25/08* (2013.01); *G05D 1/0891* (2013.01)

(58) Field of Classification Search
  CPC ............. B60G 2300/45; B60G 21/007; B60G 2800/012; B62J 99/00; B62J 15/02; B62J 17/00; B62J 45/40; B62K 5/027; B62K 5/05; B62K 5/08; B62K 5/10; B62K 25/08; B62K 2204/00; B62K 5/01; G05D 1/0891; B60K 17/356; B60W 2300/156; B60W 2510/20; B60Y 2200/223; B62D 9/02
  See application file for complete search history.

(56) References Cited

U.S. PATENT DOCUMENTS

| | | | |
|---|---|---|---|
| 5,927,424 A | 7/1999 | Van Den Brink et al. | |
| 7,264,251 B2 | 9/2007 | Marcacci | |
| 7,802,800 B2* | 9/2010 | Melcher | B62K 5/01 |
| | | | 280/5.509 |
| 8,141,890 B2* | 3/2012 | Hughes | B60G 21/007 |
| | | | 280/124.103 |
| 8,762,003 B2* | 6/2014 | Mercier | B62K 5/05 |
| | | | 701/41 |
| 8,899,600 B2 | 12/2014 | Gaillard-Groleas et al. | |
| 9,744,952 B2* | 8/2017 | Seto | B62K 5/05 |
| 9,994,277 B2* | 6/2018 | Malphettes | B60G 3/20 |
| 2005/0167174 A1 | 8/2005 | Marcacci | B62K 5/08 |
| | | | 180/76 |
| 2005/0167217 A1* | 8/2005 | Marcacci | B62K 5/027 |
| | | | 188/300 |
| 2007/0246903 A1* | 10/2007 | Melcher | B62K 5/01 |
| | | | 280/124.103 |
| 2009/0152940 A1* | 6/2009 | Mercier | B62K 5/027 |
| | | | 303/113.2 |
| 2010/0044977 A1* | 2/2010 | Hughes | B60G 21/007 |
| | | | 280/5.509 |
| 2010/0324808 A1* | 12/2010 | Moulene | B62K 5/027 |
| | | | 701/124 |
| 2011/0006498 A1* | 1/2011 | Mercier | B62K 5/10 |
| | | | 280/124.103 |
| 2011/0148052 A1* | 6/2011 | Quemere | B60G 21/007 |
| | | | 280/6.15 |
| 2011/0239787 A1* | 10/2011 | Kato | B62K 5/027 |
| | | | 73/862.335 |
| 2012/0119453 A1 | 5/2012 | Mercier | |
| 2012/0267870 A1 | 10/2012 | Mercier | |
| 2013/0068550 A1* | 3/2013 | Gale | B62K 5/027 |
| | | | 180/216 |
| 2013/0113174 A1 | 5/2013 | Mercier | |
| 2013/0161919 A1* | 6/2013 | Gaillard-Groleas | B60G 99/00 |
| | | | 280/124.103 |
| 2013/0193656 A1* | 8/2013 | Itoh | B60G 21/007 |
| | | | 280/5.509 |
| 2013/0211674 A1* | 8/2013 | Young | B60G 21/073 |
| | | | 701/37 |
| 2014/0124286 A1* | 5/2014 | Hayashi | B60G 9/02 |
| | | | 180/400 |
| 2014/0188341 A1* | 7/2014 | Takenaka | B62J 45/411 |
| | | | 701/41 |
| 2014/0361502 A1* | 12/2014 | Kitamura | B62K 5/05 |
| | | | 280/5.515 |
| 2015/0158360 A1* | 6/2015 | Uebayashi | B62K 5/10 |
| | | | 280/5.508 |
| 2015/0165855 A1* | 6/2015 | Yu | B60G 17/00 |
| | | | 280/5.508 |
| 2017/0106930 A1* | 4/2017 | Hara | B62K 5/027 |
| 2018/0086168 A1* | 3/2018 | Iguchi | B62K 5/027 |
| 2018/0086169 A1* | 3/2018 | Iguchi | B60G 17/0162 |
| 2018/0264906 A1* | 9/2018 | Hara | B62J 99/00 |
| 2018/0265158 A1* | 9/2018 | Hara | B62K 5/027 |
| 2019/0144035 A1* | 5/2019 | Doerksen | B60G 17/0162 |
| | | | 280/124.103 |

FOREIGN PATENT DOCUMENTS

| | | |
|---|---|---|
| EP | 1516806 A1 | 3/2005 |
| EP | 1571016 A1 | 9/2005 |
| EP | 2127920 A1 | 12/2009 |
| EP | 2345576 A1 | 7/2011 |
| EP | 2451699 A1 | 5/2012 |
| EP | 2530005 A1 | 12/2012 |
| EP | 2585320 A1 | 5/2013 |
| EP | 2765024 A1 | 8/2014 |
| EP | 2767464 A1 | 8/2014 |
| EP | 2889210 A1 | 7/2015 |
| JP | 2005088742 A | 4/2005 |
| JP | 2010-047151 A | 3/2010 |
| JP | 2011-046294 A | 3/2011 |
| JP | 2011-073624 A | 4/2011 |
| JP | 2011-201504 A | 10/2011 |
| JP | 2012-076490 A | 4/2012 |
| JP | 2012-081784 A | 4/2012 |
| JP | 2013-112238 A | 6/2013 |
| JP | 2013-144471 A | 7/2013 |
| JP | 2014-091506 A | 5/2014 |
| JP | 2014-237362 A | 12/2014 |
| JP | 2015-112923 A | 6/2015 |
| WO | 0244008 A2 | 6/2002 |
| WO | 02068228 A1 | 9/2002 |
| WO | 2009059099 A2 | 5/2009 |
| WO | WO-2011/005945 A1 | 1/2011 |
| WO | 2011029795 A1 | 3/2011 |
| WO | WO 2011-059456 A1 | 5/2011 |
| WO | WO 2011-161334 A1 | 12/2011 |
| WO | WO-2013/051195 A1 | 4/2013 |
| WO | WO-2015/146680 A1 | 10/2015 |
| WO | 2017115293 A1 | 7/2017 |

OTHER PUBLICATIONS

Noriaki Hirose et al. "Proposal of motion model around roll axis and posture stabilization control for personal mobility with leaning mechanism", Transactions of the JSME (in Japanese). The Japan Society of Mechanical Engineers, 2015, vol. 81, No. 826, pp. 1-12, DOI:10.1299/transjsme.15-00087, ISSN: 2187-9761.

* cited by examiner

LEANING VEHICLE

CROSS-REFERENCES TO RELATED APPLICATIONS

The present application is a continuation-in-part application of International Application No. PCT/JP2016/083978, filed on Nov. 16, 2016, and having the benefit of the earlier filing date of Japanese Application No. 2015-227878, filed Nov. 20, 2015. The content of each of the identified applications is incorporated herein by reference in its entirety.

TECHNICAL FIELD

The present teaching relates to a technique for controlling a tilt angle of a leaning vehicle in a left direction of a body frame or in a right direction of the body frame.

BACKGROUND ART

A known vehicle performs cornering by tilting a body frame in a left direction or in a right direction. For example, a vehicle disclosed in WO2011/005945 (Patent Document 1 listed below) includes a body frame supporting an engine and a shock tower rotatably attached to the body frame. A left front wheel and a right front wheel are disposed at the left and the right of a rotation axis of the shock tower. A suspension of the left front wheel and a suspension of the right front wheel are connected to an end of the shock tower. The vehicle also includes an actuator for adjusting a rotation of the shock tower with respect to the body frame. When the vehicle speed decreases below a threshold with the body frame tilted, the actuator generates a torque on the shock tower so that the body frame stands in an upright position. Accordingly, the frame may be easily maintained in the upright position in low-speed traveling.

CITATION LIST

Patent Document

Patent Document 1: WO2011/005945

A tilt angle in the left direction of a vehicle or in the right direction of the vehicle, that is, a roll angle, while the vehicle is traveling at low speed toward stop is susceptible to the influence of an unevenness and a tilt of a road surface, a barycenter shift by a rider, and a steering, and so forth.

SUMMARY

It is therefore an object of the present teaching to provide a leaning vehicle that may easily control a tilt angle of a vehicle in a left direction or in a right direction.

Advantageous Effects of Invention

A leaning vehicle having a first configuration of the present teaching includes a body frame, and a right wheel and a left wheel arranged in a left-right direction of the body frame. The body frame tilts rightward when turning rightward in a left-right direction of the leaning vehicle, and tilts leftward when turning leftward. The leaning vehicle includes a linkage mechanism. The linkage mechanism includes an arm rotatably supported on the body frame. Relative positions of the right wheel and the left wheel relative to the body frame in a top-bottom direction of the leaning vehicle are changed by rotating the arm with respect to the body frame. Accordingly, the body frame tilts in a left direction of the leaning vehicle or in a right direction of the leaning vehicle. The leaning vehicle includes a buffer device that buffers motion of the right wheel and the left wheel with respect to the body frame. The leaning vehicle includes a left-right tilt angle control mechanism, a buffer control mechanism, and a control section for controlling these mechanisms. The left-right tilt angle control mechanism includes an actuator for adjusting a rotation of the arm with respect to the body frame. The left-right tilt angle control mechanism controls a tilt angle of the body frame in the left direction of the leaning vehicle or in the right direction of the leaning vehicle. The buffer control mechanism may suppress motion of the buffer device and cancel suppression of the motion. The control section performs control of the buffer control mechanism at least partly by causing the buffer control mechanism to suppress motion of the buffer device in a period in which the vehicle speed of the leaning vehicle is in at least in a part of a low-speed traveling range of an entire vehicle speed range of the leaning vehicle except for a stopped state, and in at least a period in which the left-right tilt angle control mechanism controls the tilt angle, and the entire vehicle speed range is divided into the low-speed traveling range and a high-speed traveling range (first configuration).

With the first configuration, the tilt angle in the left direction of the leaning vehicle or in the right direction of the leaning vehicle may be easily controlled during low-speed traveling.

In the first configuration, the control section may continue control of suppressing the motion of the buffer device by the buffer control mechanism until the leaning vehicle stops (second configuration). With this second configuration, the tilt angle in the left direction of the leaning vehicle or in the right direction of the leaning vehicle may be easily controlled during low-speed traveling.

In the second configuration, the control section may also continue the control of suppressing the motion of the buffer device by the buffer control mechanism while the leaning vehicle is stopped (third configuration). With this third configuration, control of the tilt angle in the left direction of the leaning vehicle or in the right direction of the leaning vehicle may be easily performed while the leaning vehicle is stopped.

In the third configuration, the control section may cancel suppression of the motion of the buffer device by the buffer control mechanism after the leaning vehicle starts traveling (fourth configuration). With this fourth configuration, when the leaning vehicle starts traveling, motion of the buffer device is suppressed, and once having started traveling, suppression of the motion of the buffer device is canceled. Accordingly, at the start of traveling of the leaning vehicle, control of the tilt angle in the left direction of the leaning vehicle or in the right direction of the leaning vehicle may be easily performed.

In any one of the first through fourth configurations, the control section may cancel suppression of the motion of the buffer device by the buffer control mechanism based on information on at least one of a rider's intention of causing the leaning vehicle to travel or a rider's intention of canceling suppression of the motion of the buffer device (fifth configuration). With the fifth configuration, when a rider performs an operation with an intention of causing the leaning vehicle to travel or an intention of canceling suppression of the motion of the buffer device, suppression of the motion of the buffer device may be canceled.

In any one of the first through fifth configurations, the control section may continue control of the tilt angle by the left-right tilt angle control mechanism until the leaning vehicle stops (sixth configuration). With this sixth configuration, the tilt angle of the body frame in the left direction or in the right direction may be controlled from low-speed traveling to stop.

In the sixth configuration, the control section may also continue the control of the tilt angle by the left-right tilt angle control mechanism while the leaning vehicle is stopped (seventh configuration). With this seventh configuration, the tilt angle of the body frame in the left direction or in the right direction may also be controlled while the leaning vehicle is stopped.

In the seventh configuration, the control section may cancel the control of the tilt angle by the left-right tilt angle control mechanism after the leaning vehicle starts traveling (eighth configuration). With this eighth configuration, when the leaning vehicle starts traveling, the tilt angle of the body frame in the left direction or in the right direction is controlled, and after the leaning vehicle has started traveling, the control of the tilt angle is canceled. Accordingly, at the start of traveling of the leaning vehicle, the tilt angle of the body frame in the left direction or in the right direction may be controlled.

In the first through eighth configurations, the control of the tilt angle by the left-right tilt angle control mechanism may be canceled based on information on at least one of a rider's intention of causing the leaning vehicle to travel or a rider's intention of canceling control of the tilt angle by the left-right tilt angle control mechanism (ninth configuration). With this ninth configuration, when the rider has the intention of causing the leaning vehicle to travel or the intention of canceling control of the tilt angle by the left-right tilt angle control mechanism, the control of the tilt angle of the body frame in the left direction or in the right direction may be canceled.

In the fifth or ninth configuration, the control section may acquire the information on the rider's intention of causing the leaning vehicle to travel by detecting at least one of an increase in a throttle opening degree, a decrease in a manipulated variable of a brake or cancellation of a brake operation, an increase in a vehicle speed, or an increase in an acceleration in a front direction of the vehicle or in a rear direction of the vehicle (tenth configuration). With the tenth configuration, information on the rider's intention of causing the leaning vehicle to travel may be obtained.

In any one of the first through tenth configurations, the actuator of the left-right tilt angle control mechanism may apply a force against rotation of the arm with respect to the body frame (eleventh configuration). This eleventh configuration may be achieved by forming the actuator by using, for example, a motor or a hydraulic damper.

In any one of the first through eleventh configurations, the actuator of the left-right tilt angle control mechanism may apply a force for rotating the arm with respect to the body frame (twelfth configuration). This twelfth configuration may be achieved by forming the actuator by using, for example, a motor or a hydraulic cylinder.

In any one of the first through twelfth configurations, the actuator of the left-right tilt angle control mechanism may be provided independently of the buffer control mechanism (thirteenth configuration).

A control method by the control section in any one of the first through thirteenth configurations is included in embodiments of the present teaching. A program of causing a computer to perform control of the control section and a non-transitory recording medium on which the program is recorded are also included in embodiments of the present teaching.

In the following description, suspensions are an example of the buffer device. A suspension control mechanism is an example of the buffer control mechanism. A roll angle is the same as the tilt angle of the body frame in the left direction of the leaning vehicle or in a right direction of the leaning vehicle. A roll angle control mechanism is the same as the left-right tilt angle control mechanism.

A vehicle according to an embodiment of the present teaching includes: a body frame; a right wheel and a left wheel that are arranged in a left-right direction of the body frame; a linkage mechanism including an arm disposed between the body frame and each of the right wheel and the left wheel and rotatably supported on the body frame, the linkage mechanism being configured to change relative positions of the right wheel and the left wheel relative to the body frame in a top-bottom direction of the leaning vehicle and tilt the body frame in the vertical direction by rotating the arm with respect to the body frame; a suspension disposed between the body frame and each of the right wheel and the left wheel and configured to extend and contract to thereby absorb motion of the right wheel and the left wheel with respect to the body frame; a roll angle control mechanism configured to control a roll angle of the body frame by adjusting a rotation of the arm with respect to the body frame; a suspension control mechanism configured to suppress extension and contraction of the suspension; and a control section configured control the roll angle control mechanism and the suspension control mechanism based on information indicating a state of the vehicle. The control section determines whether to cause the roll angle control mechanism to perform roll angle control during traveling toward stop based on a predetermined condition, and performs control of causing the suspension control mechanism to suppress extension and contraction of the suspension in at least a part of a period in which the roll angle control during traveling toward the stop is performed.

In the above configuration, the control section determines whether roll angle control during traveling toward stop is necessary or not based on a predetermined condition (first condition). The roll angle control mechanism adjusts rotation of the arm based on determination of the control section. Consequently, the roll angle of the body frame is controlled to a roll suitable for traveling toward stop. The control section causes the roll angle control mechanism to suppress extension and contraction of the suspension in at least a period in which roll angle control during traveling toward stop is performed. Accordingly, in the course of transferring rotation of the arm adjusted by the roll angle control mechanism to the body frame, generation of a transfer delay of a force by the suspension may be suppressed. Thus, in traveling toward stop, motion of the roll angle of the body frame controlled by adjusting an arm rotation by the roll angle control mechanism may be easily controlled.

The control section may also continue suppression of extension and contraction of the suspension by the suspension control mechanism after the vehicle stops, and cancel the suppression of extension and contraction of the suspension by the suspension control mechanism after the vehicle starts traveling. Accordingly, suppression of extension and contraction of the suspension during traveling continues after the stop, and is then canceled after traveling starts again. Thus, during traveling toward stop and during stop, generation of a force transfer delay by the suspension may be suppressed. In addition, after the start of traveling, suppression of the suspension is canceled so that control for absorbing a shock from the ground may be performed.

The control section may also continue roll angle control by the roll angle control mechanism after the vehicle stops, and cancel the roll angle control by the roll angle control mechanism after the vehicle starts traveling. Accordingly, the roll angle control during traveling toward stop continues after the stop, and is then canceled after traveling starts again. Thus, the roll angle controlled toward stop continues after the stop. After traveling starts, the control of the roll angle is canceled so that the roll angle control mechanism does not inhibit the rider's control of the roll angle.

If the vehicle state satisfies the second condition, the control section may cancel roll angle control during traveling toward stop. If the vehicle state satisfies the third condition, the control section may start suppression of extension and contraction of the suspension. In addition, if the vehicle state satisfies the fourth condition, the control section may cancel suppression of extension and contraction of the suspension. Here, the first through fourth conditions may be different from one another. Accordingly, start and cancel of roll angle control toward stop and start and cancel of suppression of extension and contraction of the suspension may be determined independently without constraints from each other. Consequently, each of the roll angle control toward stop and suppression of extension and contraction of the suspension may be performed at any time or timing.

A combination of parameters indicating the vehicle state used for determining whether roll angle control during traveling toward the stop by the roll angle control mechanism is necessary or not may be different from a combination of parameters indicating the vehicle state used for determining whether suppression of extension and contraction of the suspension by the suspension control mechanism is necessary or not. Accordingly, it may be easily determined whether suppression of extension and contraction of the suspension is necessary or not without a constraint of determination on whether roll angle control toward stop is necessary or not, and vice versa. Consequently, each of the roll angle control toward stop and suppression of extension and contraction of the suspension may be performed at any time or timing.

A threshold of a first parameter used in determining whether roll angle control during traveling toward the stop by the roll angle control mechanism is necessary or not may be different from a threshold of the first parameter used in determining whether suppression of extension and contraction of the suspension by the suspension control mechanism is necessary or not. Accordingly, whether the roll angle control is necessary or not and whether suppression of extension and contraction of the suspension is necessary or not may be determined based on different conditions. Consequently, each of the roll angle control toward stop and suppression of extension and contraction of the suspension may be performed at any time or timing.

The parameter used in determining whether the roll angle control during traveling toward the stop by the roll angle control mechanism is necessary or not may include a vehicle speed, a throttle opening degree, and a roll angle. The parameter used in determining whether the suppression of extension and contraction of the suspension by the suspension control mechanism is necessary or not may include a vehicle speed.

The roll angle control mechanism may include an actuator for adjusting an rotation of the arm with respect to the body frame. The actuator may be disposed independently of the suspension control mechanism. Accordingly, the mechanism for controlling the roll angle and the suspension control mechanism may operate independently of each other. Consequently, each of the roll angle control toward stop and suppression of extension and contraction of the suspension may be performed at any time or timing.

A method for controlling a vehicle is also an embodiment of the present teaching. The vehicle in this control method includes: a body frame; a right wheel and a left wheel that are arranged in a left-right direction of the body frame; a linkage mechanism including an arm disposed between the body frame and each of the right wheel and the left wheel and rotatably supported on the body frame, the linkage mechanism being configured to change relative positions of the right wheel and the left wheel relative to the body frame in a top-bottom direction of the leaning vehicle and tilt the body frame in the vertical direction by rotating the arm with respect to the body frame; and a suspension disposed between the body frame and each of the right wheel and the left wheel and configured to extend and contract to thereby absorb motion of the right wheel and the left wheel with respect to the body frame. The control method includes: a roll angle control step of controlling a roll angle of the body frame by adjusting an rotation of the arm with respect to the body frame; a suspension control step of suppressing extension and contraction of the suspension; and a control step of controlling execution of the roll angle control step and the suspension control step based on information indicating a state of the vehicle. The control step includes the step of determining whether to perform roll angle control during traveling toward stop in the roll angle control step or not based on a predetermined condition, and performing the suspension control step in at least a part of a period in which the roll angle control during traveling toward stop is performed.

DETAILED DESCRIPTION

Figure 1:
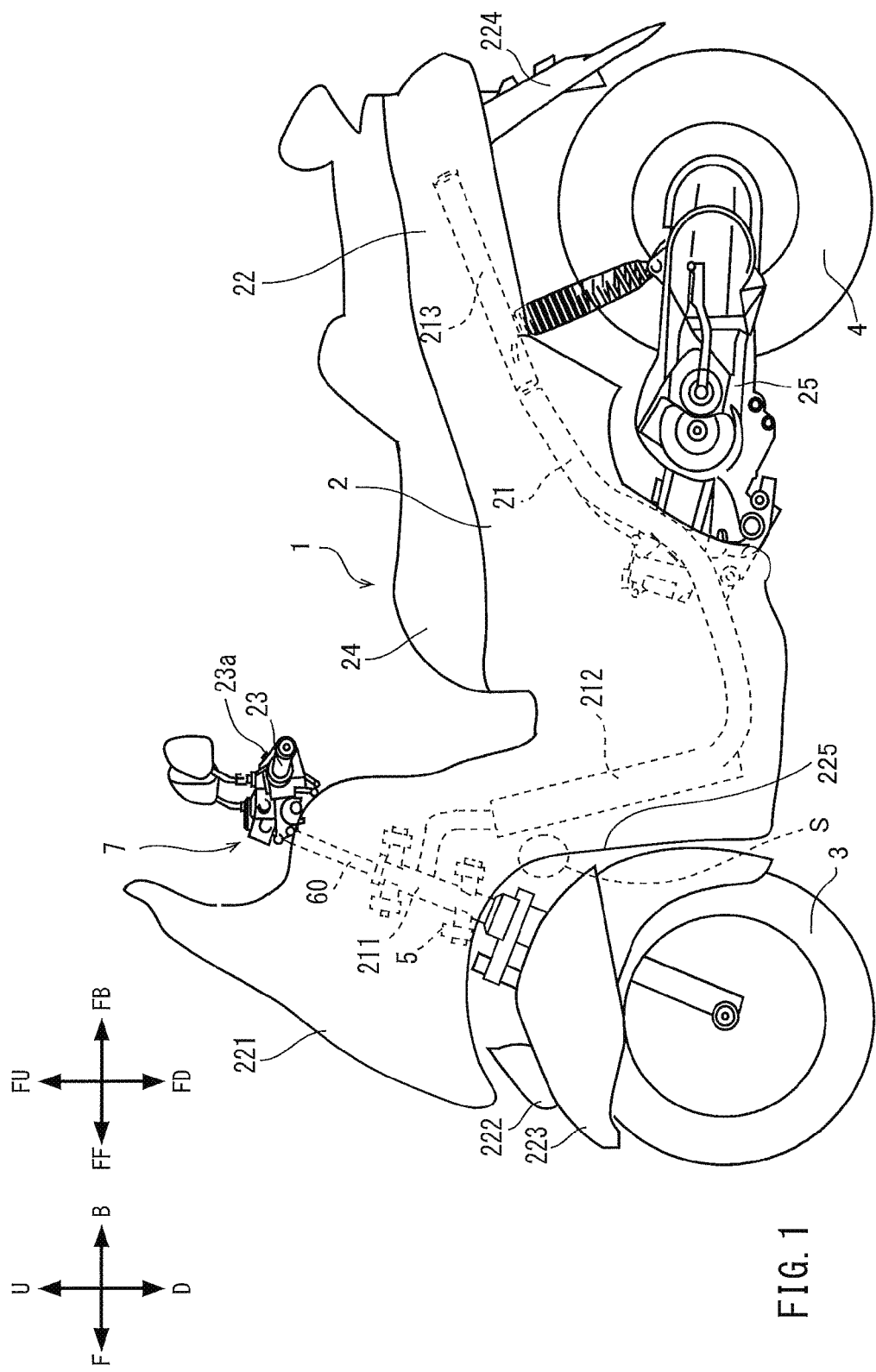
FIG. 1 is a left side view of an overall vehicle according to an embodiment when viewed from the left.

The inventors of the present teaching evaluated the control of a tilt (roll angle) of a vehicle at low speed by using an actuator. Specifically, the inventors studied such roll angle control performed when an actuator is operated to have a body frame in an upright position in a case where the body frame tilts and the vehicle speed is below a threshold.

For example, when the vehicle speed is reduced with the body frame tilted leftward, the actuator exerts a force for causing the body frame to approach the upright position. Here, if the road surface on which the vehicle is traveling has an unevenness or a tilt in the left direction of the vehicle or in the right direction of the vehicle, the force exerted by the actuator causes the body frame to change to the upright position from a leftward tilt state and then gives momentum to the body frame so that the body frame tilts rightward in some cases. In another case, with the force exerted by the actuator, the body frame does not reach the upright position and is kept tilting leftward. In still another case, when the rider performs an operation of tilting the body frame in the left direction or in the right direction while the actuator is operating, the force exerted by the actuator causes the body frame to further tilt across the upright position.

The inventors increased the responsiveness of the actuator for adjusting the roll angle, but a similar behavior was still observed. Thus, the inventors further studied, focusing on a spring element and an attenuation element interposed between an operation of the actuator and an operation of the roll angle. From this viewpoint, the inventors investigated a change in the tilt angle of the body frame by the actuator. It was found that a delay of transfer caused by the spring element and the attenuation element occurs before a torque generated by the actuator is transferred to the body frame to change the tilt angle. The inventors further studied the spring element and the attenuation element, to find that the spring element and the attenuation element of a buffer device disposed between the body frame and a wheel may affect a change in the tilt angle of the body frame caused by the actuator in some cases.

On the other hand, a suppression of motion of the buffer device during traveling facilitates transfer of motion of the wheel in the top-bottom direction to the body frame. Accordingly, the body frame is more greatly vibrated in some cases. The inventors, however, have dared to study a suppression of motion of the buffer device in roll angle controlling during traveling. The study shows that a suppression of motion of the buffer device in controlling a left-right tilt angle of the body frame by the actuator during low-speed traveling enables a force exerted by the actuator to efficiently affect a behavior of the left-right tilt angle of the body frame. Accordingly, it was found that a left-right tilt may be easily controlled by suppressing motion of the buffer device in a vehicle susceptible to the influence of an unevenness and a tilt of a road surface and an operation of tilting the body frame by a rider in low-speed traveling.

The linkage mechanism is disposed between the body frame and each of right and left wheels. The linkage mechanism is a mechanism capable of changing relative positions of the right and left wheels in the top-bottom direction with respect to the body frame. Thus, for example, in a case where one of the right and left wheels passes over a stepped ground surface and the other passes over a flat ground surface, only the former wheel moves up and down in a range in accordance with the height of the step. In this case, the range of the up and down movement of the body frame is smaller than the height of the step. That is, motion in the top-bottom direction exerted on the former wheel is absorbed by the linkage mechanism. As described above, the inventors found that a certain amount of an impact on the wheels from the ground may be absorbed by the linkage mechanism even in a case where extension and contraction of the buffer device is suppressed. Based on these findings, the inventors arrived at a configuration of a vehicle according to an embodiment described below.

A leaning vehicle according to the embodiment includes a body frame and a right wheel and a left wheel disposed in a left-right direction of the body frame. The body frame tilts rightward when turning rightward in a left-right direction of the leaning vehicle, and tilts leftward when turning leftward. The leaning vehicle includes a linkage mechanism. The linkage mechanism includes an arm rotatably supported on the body frame. The arm supports the right wheel and the left wheel. Relative positions of the right wheel and the left wheel relative to the body frame in a top-bottom direction of the leaning vehicle are changed by rotating the arm with respect to the body frame. Accordingly, the body frame tilts in the left direction of the leaning vehicle or in the right direction of the leaning vehicle. The leaning vehicle includes a buffer device that buffers motion of the right wheel and the left wheel with respect to the body frame. The leaning vehicle includes a left-right tilt angle control mechanism, a buffer control mechanism, and a control section for controlling these mechanisms. The left-right tilt angle control mechanism includes an actuator for adjusting a rotation of the arm with respect to the body frame. The left-right tilt angle control mechanism controls a tilt angle of the body frame in the left direction of the leaning vehicle or in the right direction of the leaning vehicle. The buffer control mechanism may suppress motion of the buffer device and cancel suppression of the motion. The control section performs control in such a manner that the buffer control mechanism suppresses motion of the buffer device in a period in which the vehicle speed of the leaning vehicle is in at least in a part of a low-speed traveling range of the low-speed traveling range and a high-speed traveling range obtained by dividing the entire vehicle-speed range of the leaning vehicle except for a stopped state and in at least a period in which the left-right tilt angle control mechanism controls the tilt angle control.

In this configuration, the buffer control mechanism suppresses motion of the buffer device in a period in at least a part of the low-speed traveling range and in at least a part of the period in which the left-right tilt angle control mechanism performs the tilt angle control. Accordingly, for example, in at least a part of the period in which the left-right tilt angle control mechanism performs left-right tilt angle control of the body frame during traveling toward stop, motion of the buffer device is suppressed. Consequently, in the left-right tilt angle control of the body frame in the low-speed traveling range, the spring element and the attenuation element interposed between the arm whose rotation is adjusted by the left-right tilt angle control mechanism and the body frame which may change the left-right tilt angle may be reduced. This reduction may suppress a delay of transfer of a force in the course of transfer of rotation of the arm to the body frame. As a result, the tilt angle in the left direction of the leaning vehicle or in the right direction of the leaning vehicle may be easily controlled during low-speed traveling.

In the low-speed traveling range, even with suppression of motion of the buffer device, the linkage mechanism absorbs motion of the right wheel and the left wheel. Accordingly, an increase in vibrating of the body frame by suppressing motion of the buffer device can be suppressed. As a result, during low-speed traveling, the tilt angle in the left direction of the leaning vehicle or in the right direction of the leaning vehicle may be easily controlled, and an increase in vibrations of the body frame may be suppressed.

An embodiment of the present teaching will be described in detail with reference to the drawings.

In the drawings, arrow F represents the forward direction of a vehicle. Arrow B represents the rearward direction of the vehicle. Arrow U represents the upward direction of the vehicle. Arrow D represents the downward direction of the vehicle. Arrow R represents the rightward direction of the vehicle. Arrow L represents the leftward direction of the vehicle.

The vehicle turns with the body frame being tilted in the left direction of the vehicle or in the right direction of the vehicle relative to the vertical direction. Thus, in addition to the directions relative to the vehicle, directions relative to the body frame are defined. In the accompanying drawings, arrow FF represents the forward direction of the body frame. Arrow FB represents the rearward direction of the body frame. Arrow FU represents the upward direction of the body frame. Arrow FD represents the downward direction of the body frame. Arrow FR represents the rightward direction of the body frame. Arrow FL represents the leftward direction of the body frame.

The "front-rear direction of the body frame", the "left-right direction of the body frame", and the "top-bottom direction of the body frame" herein refer to the front-rear direction, the left-right direction, and the top-bottom direction, respectively, relative to the body frame when seen from a rider driving the vehicle. In addition, "to a side of the body frame" refers to the rightward or leftward direction of the body frame.

The expression "extending in the front-rear direction of the body frame" herein includes extending in a direction with a tilt relative to the front-rear direction of the body frame. In this case, a tilt of the extension direction relative to the front-rear direction of the body frame is often smaller than a tilt relative to the left-right direction of the body frame and a tilt relative to the top-bottom direction of the body frame.

The expression "extending in the left-right direction of the body frame" herein includes extending in a direction with a tilt relative to the left-right direction of the body frame. In this case, a tilt of the extension direction relative to the left-right direction of the body frame is often smaller than a tilt relative to the front-rear direction of the body frame and a tilt relative to the top-bottom direction of the body frame.

The expression "extending in the top-bottom direction of the body frame" herein includes extending in a direction with a tilt relative to the top-bottom direction of the body frame. In this case, a tilt of the extension direction relative to the top-bottom direction of the body frame is often smaller than a tilt relative to the front-rear direction of the body frame and a tilt relative to the left-right direction of the body frame.

The "upright position of the body frame" herein refers to a state where the top-bottom direction of the body frame coincides with the vertical direction. In this state, the directions relative to the vehicle coincide with the directions relative to the body frame. While the body frame is tilted in the left direction or in the right direction relative to the vertical direction, the left-right direction of the vehicle does not coincide with the left-right direction of the body frame. In this case, the top-bottom direction of the vehicle does not coincide with the top-bottom direction of the body frame, either. However, even while the body frame is tilted in the left direction or in the right direction relative to the vertical direction, the front-rear direction of the vehicle coincides with the front-rear direction of the body frame.

The expression "the roll angle of the body frame" herein refers to an angle of rotation of the body frame about the front-rear direction. The roll angle of the body frame is the same as a tilt angle of the body frame in the left direction of the vehicle or in the right direction of the vehicle. As an example, the roll angle may be expressed by an angle of the top-bottom line of the body frame relative to the vertical direction. The vertical direction is the same as the gravity direction.

(Vehicle Configuration)

FIG. 1 is a left side view of the entire vehicle 1 when viewed from the left. The vehicle 1 includes a vehicle body 2, a pair of left and right front wheels 3, a rear wheel 4, a linkage mechanism 5, and a steering mechanism 7.

The vehicle body 2 includes a body frame 21, a body cover 22, a sheet 24, and a power unit 25. In FIG. 1, the body frame 21 is in an upright position. The following description with reference to FIG. 1 is based on a premise that the body frame 21 is in the upright position. The vehicle 1 is a leaning vehicle. While the vehicle 1 is turning, the body frame 21 tilts in the turning direction.

The body frame 21 includes a head pipe 211, a down frame 212, and a rear frame 213. In FIG. 1, a portion of the body frame 21 hidden by the body cover 22 is indicated by broken lines. The body frame 21 supports the sheet 24 and the power unit 25. The power unit 25 supports the rear wheel 4. The power unit 25 includes a driving source such as an engine, an electric motor, or a battery, and a device such as a transmission.

The head pipe 211 is disposed in a front portion of the vehicle 1. When viewed from a side of the body frame 21, an upper portion of the head pipe 211 is disposed behind a lower portion of the head pipe 211.

The down frame 212 is connected to the head pipe 211. The down frame 212 is disposed behind the head pipe 211. The down frame 212 extends in the top-bottom direction of the body frame 21.

The rear frame 213 is disposed behind the down frame 212. The rear frame 213 extends in the front-rear direction of the body frame 21. The rear frame 213 supports the sheet 24 and the power unit 25.

The body cover 22 includes a front cover 221, a front spoiler 222, a pair of left and right front fenders 223, a rear fender 224, and a leg shield 225. The body cover 22 is a body part covering at least a portion of body parts mounted on the vehicle 1, such as the pair of left and right front wheels 3, the body frame 21, and the linkage mechanism 5.

Figure 2:
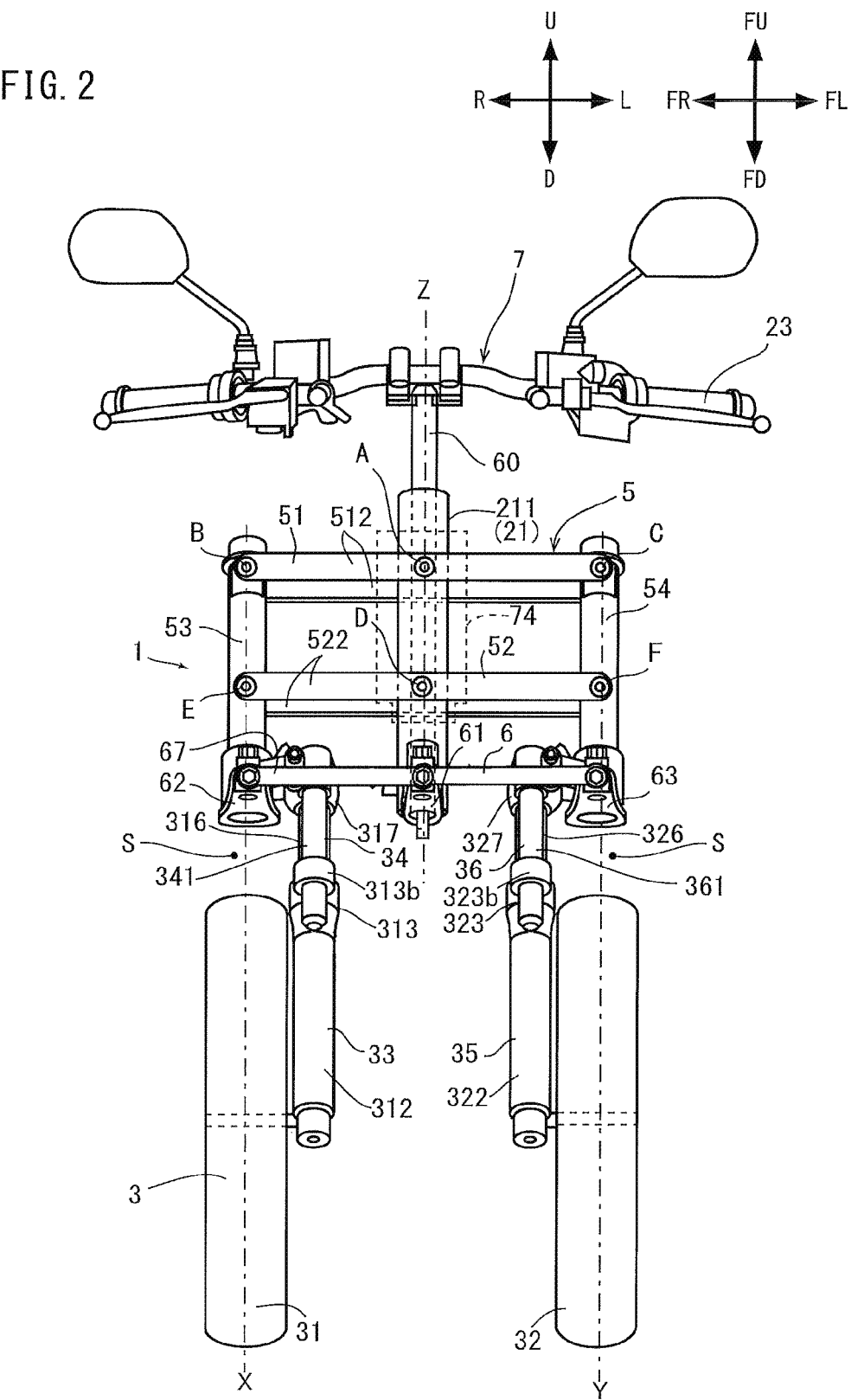
FIG. 2 is a front view of a part of the vehicle illustrated in FIG. 1 when viewed from the front.

FIG. 2 is a front view of a front portion of the vehicle 1 when viewed from the front of the body frame 21. In FIG. 2, the body frame 21 is in an upright position. The following description with reference to FIG. 2 is based on a premise that the body frame 21 is in the upright position. FIG. 2 illustrates a state where the front cover 221, the front spoiler 222, and the pair of left and right front fenders 223 are detached.

The pair of front wheels 3 includes a right wheel 31 and a left wheel 32 arranged at the right and left of the head pipe 211 (body frame 21). The linkage mechanism 5 and suspensions (a right suspension 33 and a left suspension 35) are disposed between the head pipe 211 as a part of the body frame 21 and the pair of front wheels 3. That is, the body frame 21 is connected to the right wheel 31 and the left wheel 32 through the linkage mechanism 5 and the suspensions 33 and 35. The linkage mechanism 5 is disposed below a handlebar 23. The linkage mechanism 5 is disposed above the right wheel 31 and the left wheel 32.

In the example illustrated in FIG. 2, the linkage mechanism 5 is connected to the right wheel 31 and the left wheel 32 through the suspensions 33 and 35. The arrangement of the suspensions 33 and 35 is not limited to this example. For example, the suspensions may be disposed in a part of the linkage mechanism 5. Alternatively, the suspensions may be disposed between the linkage mechanism 5 and the body frame 21.

<Linkage Mechanism>

The linkage mechanism 5 of the vehicle 1 illustrated in FIG. 2 is a linkage mechanism of a parallel four-bar linkage (also called parallelogram linkage) type linkage mechanism. The linkage mechanism 5 includes an upper arm 51, a lower arm 52, a right side member 53, and a left side member 54.

The linkage mechanism 5 includes the upper arm 51 and the lower arm 52 (hereinafter collectively referred to as arms 51 and 52 when not specifically distinguished) rotatably supported on the body frame 21. The arms 51 and 52 are rotatable about rotation axes extending in the front-rear direction with respect to the body frame 21. The rotation axes are disposed at the centers of the arms 51 and 52 in the left-right direction. That is, intermediate portions of the arms 51 and 52 are supported by the head pipe 211 on support parts A and D. The rotation axes of the arms 51 and 52 pass through the support parts A and D. The right wheel 31 is disposed at the right of the rotation axes, and the left wheel 32 is disposed at the left of the rotation axes. The right wheel 31 is connected to right portions of the arms 51 and 52 relative to the rotation axes through the right side member 53 and the right suspension 33. The left wheel 32 is connected to left portions of the arms 51 and 52 relative to the rotation axes through the left side member 54 and the left suspension 35.

As described above, since the right wheel 31 is connected to the right portions of the arms 51 and 52 relative to the rotation axes and the left wheel 32 is connected to the left portions of the arms 51 and 52 relative to the rotation axes, relative positions of the right wheel 31 and the left wheel 32 relative to the body frame 21 in the top-bottom directions FU and FD may be adjusted. That is, rotations of the arms 51 and 52 change relative positions the right wheel 31 and the left wheel 32 disposed at the right and left of the rotation axes of the arms 51 and 52 in the top-bottom directions FU and FD with respect to the body frame 21. When the relative positions of the right wheel 31 and the left wheel 32 in the top-bottom directions FU and FD change, the body frame 21 tilts in the left direction or in the right direction relative to the vertical direction. Accordingly, by adjusting the rotations of the arms 51 and 52 with respect to the body frame 21, a tilt in the left direction or in the right direction, that is, the roll angle, of the body frame 21 may be controlled.

The upper arm 51 includes a pair of plate-shaped members 512. The pair of plate-shaped members 512 is disposed ahead of and behind the head pipe 211. Each of the plate-shaped members 512 extends in the left-right direction of the body frame 21. The lower arm 52 includes a pair of plate-shaped members 522. The pair of plate-shaped members 522 is disposed ahead of and behind the head pipe 211. Each of the plate-shaped members 522 extends in the left-right direction of the body frame 21. The lower arm 52 is disposed below the upper arm 51. The length of the lower arm 52 in the left-right direction of the body frame 21 is equal to or approximately equal to the length of the upper arm 51 in the left-right direction of the body frame 21. The lower arm 52 extends in parallel with the upper arm 51.

The configurations of the arms 51 and 52 are not limited to the above example. For example, instead of the configuration in which the arms 51 and 52 are constituted by the pair of plate-shaped members, the arms 51 and 52 may be constituted by one plate-like member disposed ahead of the head pipe 211.

The right end of the upper arm 51 and the right end of the lower arm 52 are connected to the right side member 53 extending in the top-bottom direction of the body frame 21. The right side member 53 is rotatably supported by the upper arm 51 and the lower arm 52 on support parts B and E. The right side member 53 is rotatable about rotation axes passing through the support parts B and E in the front-rear direction with respect to the upper arm 51 and the lower arm 52.

The left end of the upper arm 51 and the left end of the lower arm 52 are connected to the left side member 54 extending in the top-bottom direction of the body frame 21. The left side member 54 is rotatably supported by the upper arm 51 and the lower arm 52 on support parts C and F. The left side member 54 is rotatable about rotation axes passing through the support parts C and F in the front-rear direction with respect to the upper arm 51 and the lower arm 52.

<Suspension>

The lower end of the right side member 53 is connected to the right suspension 33 through a right bracket 317. The lower end of the left side member 54 is connected to the left suspension 35 through a left bracket 327. The right suspension 33 and the left suspension 35 may extend and contract in the top-bottom direction of the body frame 21. The upper end of the right suspension 33 is connected to the linkage mechanism 5, and the lower end of the right suspension 33 is connected to the right wheel 31. The upper end of the left suspension 35 is connected to the linkage mechanism 5, and the lower end of the left suspension 35 is connected to the left wheel 32.

The suspensions 33 and 35 are telescopic suspensions, for example. The suspensions may also be referred to as buffers. The right suspension 33 includes a right outer cylinder 312 supporting the right wheel 31 and a right inner cylinder 316 disposed in an upper portion of the right outer cylinder 312. The upper end of the right inner cylinder 316 is fixed to the right bracket 317, and the lower end of the right inner cylinder 316 is inserted in the right outer cylinder 312. When the right inner cylinder 316 moves relative to the right outer cylinder 312, the right suspension 33 extends and contracts. The left suspension 35 includes a left outer cylinder 322 supporting the left wheel 32 and a left inner cylinder 326 disposed in an upper portion of the left outer cylinder 322. The upper end of the left inner cylinder 326 is fixed to the left bracket 327, and the lower end of the left inner cylinder 326 is inserted in the left outer cylinder 322. When the left inner cylinder 326 moves relative to the left outer cylinder 322, the left suspension 35 extends and contracts.

A right rotation prevention mechanism 34 is connected between the right bracket 317 and the right outer cylinder 312. The right rotation prevention mechanism 34 prevents the right outer cylinder 312 from rotating about an axis extending in the extension/contraction direction of the right suspension 33 with respect to the right inner cylinder 316. A left rotation prevention mechanism 36 is connected to between the left bracket 327 and the left outer cylinder 322. The left rotation prevention mechanism 36 prevents the left outer cylinder 322 from rotating about an axis extending in the extension/contraction direction of the left suspension 35 with respect to the left inner cylinder 326.

Specifically, the right rotation prevention mechanism 34 includes a right rotation prevention rod 341, a right guide 313, and the right bracket 317. The right guide 313 is fixed to an upper portion of the right outer cylinder 312. The right guide 313 includes a right guide cylinder 313b in a front portion thereof.

The right rotation prevention rod 341 extends in parallel with the right inner cylinder 316. An upper portion of the right rotation prevention rod 341 is fixed to a front portion of the right bracket 317. The right rotation prevention rod 341 is disposed ahead of the right inner cylinder 316 with a part of the right rotation prevention rod 341 being inserted in the right guide cylinder 313b. Accordingly, the right rotation prevention rod 341 does not move relative to the right inner cylinder 316. With relative movement of the right inner cylinder 316 relative to the right outer cylinder 312 in the direction in which the right outer cylinder 312 extends, the right rotation prevention rod 341 also moves relative to the right guide cylinder 313b. On the other hand, rotation of the right outer cylinder 312 about an axis extending in the extension/contraction direction of the right suspension 33 with respect to the right inner cylinder 316 is prevented.

The left rotation prevention mechanism 36 includes a left rotation prevention rod 361, a left guide 323, and the left bracket 327. The left guide 323 is fixed to an upper portion of the left outer cylinder 322. The left guide 323 includes a left guide cylinder 323b in a front portion thereof.

The left rotation prevention rod 361 extends in parallel with the left inner cylinder 326. An upper portion of the left rotation prevention rod 361 is fixed to a front portion of the left bracket 327. The left rotation prevention rod 361 is disposed ahead of the left inner cylinder 326 with a part of the left rotation prevention rod 361 being inserted in the left guide cylinder 323b. Accordingly, the left rotation prevention rod 361 does not move relative to the left inner cylinder 326. With relative movement of the left inner cylinder 326 relative to the left outer cylinder 322 in the direction in which the left outer cylinder 322 extends, the left rotation prevention rod 361 also moves relative to the left guide cylinder 323b. On the other hand, rotation of the left outer cylinder 322 about an axis extending in the extension/contraction direction of the left suspension 35 with respect to the left inner cylinder 326 is prevented.

The configuration of the suspensions is not limited to the above example. For example, the right suspension 33 may be configured in such a manner that two combinations of right outer cylinders 312 and right inner cylinders 316 that move relative to each other are arranged side by side. In this case, similarly, the left suspension 35 may be configured in such a manner that two combinations of left outer cylinders 322 and left inner cylinders 326 are arranged side by side. This configuration is a double telescopic suspension. In this case, the outer cylinder and the inner cylinder forming a pair of each of the suspensions 33 and 35 are connected to each other not to move relative to each other so that the suspensions 33 and 35 may also serve as rotation prevention mechanisms. In this case, the right rotation prevention mechanism 34 and the left rotation prevention mechanism 36 as described above are unnecessary.

<Roll Angle Control Mechanism>

The vehicle 1 includes a roll angle control mechanism 74 for controlling a roll angle of the body frame 21. FIG. 2 illustrates the roll angle control mechanism 74 by dotted lines. The roll angle control mechanism 74 adjusts rotations of the arms 51 and 52 with respect to the body frame 21. The adjustment of rotation of the arms 51 and 52 controls the roll angle of the body frame 21. The roll angle control mechanism 74 is connected to the body frame 21 and to at least one of the arm 51 or the lower arm 52.

The adjustment of rotations of the arms 51 and 52 by the roll angle control mechanism 74 is not only for simply locking and unlocking the arms 51 and 52 but also for controlling a rotary force. That is, the roll angle control mechanism 74 may be configured to adjust rotations of the arms 51 and 52 by generating a torque for rotating the arms 51 and 52 with respect to the body frame 21 or a resistance to such a torque. For example, the roll angle control mechanism 74 may be configured to enable a change in the magnitude of a force for rotating the arms 51 and 52.

The roll angle control mechanism 74 may adjust rotations of the arms 51 and 52 so that the roll angle of the body frame 21 reaches an arbitrarily set target value. At this time, the roll angle control mechanism 74 may monitor an actual roll angle of the body frame 21 or a torque to the arms 51 and 52, and by using a monitoring result, determine a magnitude and an orientation of a force for rotating the arms 51 and 52.

Figure 3:
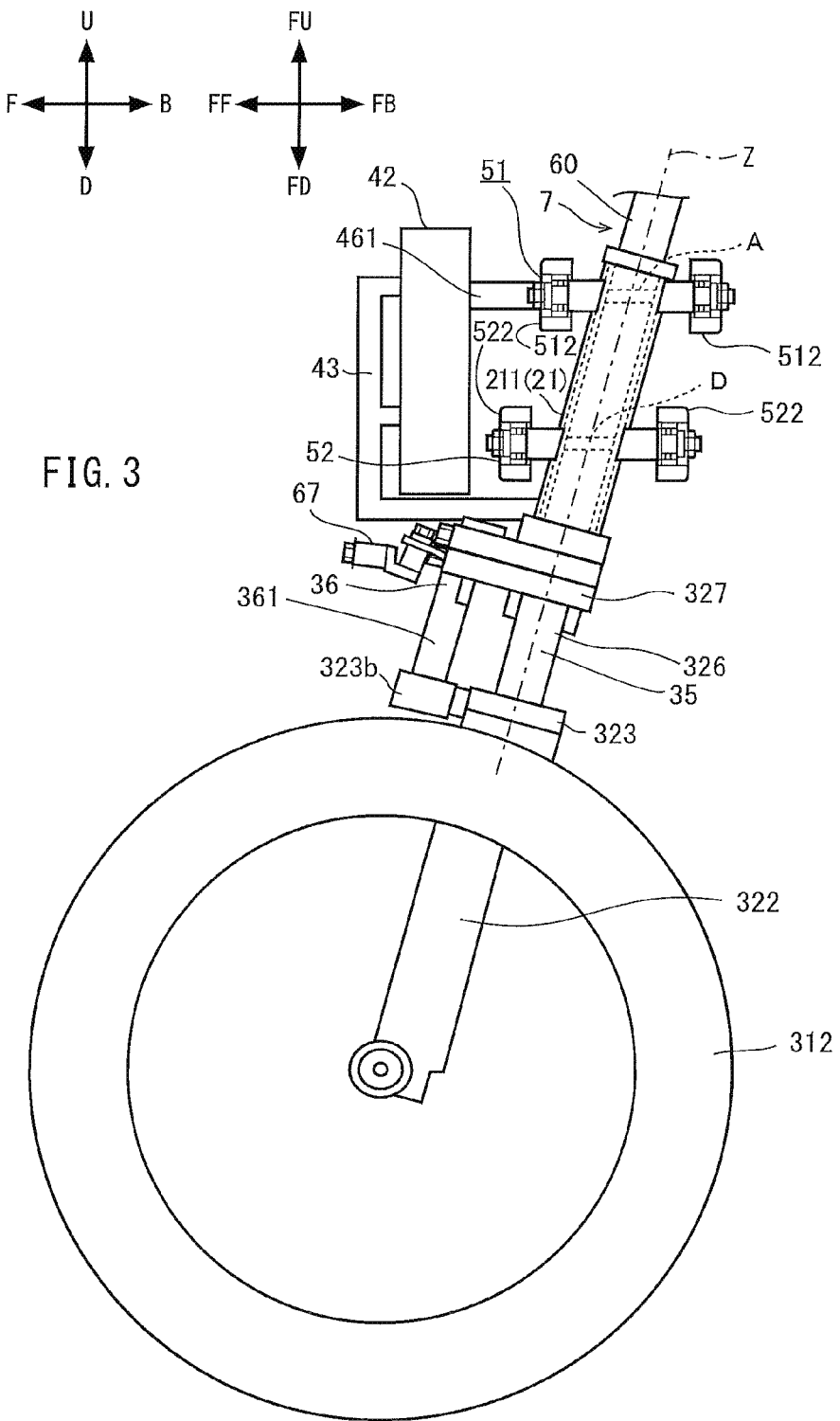
FIG. 3 is a left side view of a part of the vehicle illustrated in FIG. 1 when viewed from the left.

FIG. 3 is a left side view of a front portion of the vehicle 1 when viewed from the left of the body frame 21. In FIG. 3, the body frame 21 is in the upright position. The following description with reference to FIG. 3 is based on a premise that the body frame 21 is in the upright position. FIG. 3 illustrates a state where the front cover 221, the front spoiler 222, and the pair of left and right front fenders 223 are detached. The left side member 54 and a left transfer plate 63 are not shown in FIG. 3.

The roll angle control mechanism 74 includes an actuator 42 for adjusting the rotations of the arms 51 and 52 with respect to the body frame 21. The actuator 42 is connected to the head pipe 211 (body frame 21) through a support member 43. The support member 43 fixes the actuator 42 to the body frame 21. The actuator 42 includes an output member 461 that applies a rotary force to the upper arm 51 while being in contact with the upper arm 51. In the example illustrated in FIG. 3, the output member 461 is an output shaft that rotates about an axis. The output shaft of the output member 461 is coaxial with the rotation axis of the upper arm 51. Rotations of these output shafts are transferred to the rotation axis of the upper arm 51.

Although not shown, the actuator 42 may include a motor as a power source and a speed reducer that reduces the rotation speed of the motor and outputs the reduced speed. The speed reducer may be, for example, a deceleration gear that operates in conjunction with rotation of the motor. In this case, the output member 461 transfers rotations of the motor and the speed reducer to the outside.

The actuator 42 may operate based on a control signal from a control section (not shown) included in the vehicle 1. For example, the actuator 42 may adjust a rotary force to be applied to the arms 51 and 52 so that the roll angle of the body frame 21 reaches a target value indicated by the control section. The actuator 42 may also control an output based on a signal from a sensor that detects a state of the vehicle 1. Examples of sensors indicating the state of the vehicle includes a posture sensor for detecting a posture of the vehicle 1 and a torque sensor for detecting a torque of rotations of the arms 51 and 52 with respect to the body frame. A process of determining an output of the actuator 42 based on information from the sensor may be executed by a control circuit or a control computer incorporated in the actuator 42 or may be executed by a control device external to the actuator 42.

The configuration of the actuator 42 is not limited to the above example. For example, the actuator 42 may be configured to be connected to at least one of the upper arm 51 and the lower arm 52 and adjust rotation of the at least one of the upper arm 51 and the lower arm 52. For example, the output member of the actuator 42 may be an axial shape extending in a single-axis direction so that when the output member axially contracts, the output member applies a rotary force to the arms 51 and 52. In this case, the actuator may be configured in such a manner that one end of the actuator is rotatably connected to a position separated from the rotation axes in the arms 51 and 52 and the other end of the actuator is rotatably connected to the body frame 21. Extension and contraction of the actuator in a direction connecting one end to the other enables the arms 51 and 52 to rotate with respect to the body frame 21. The actuator 42 may be a hydraulic actuator. That is, a power source of the actuator may be electric or hydraulic. The actuator 42 may be a damper device that applies a damping force to a torque for rotating the arms 51 and 52.

<Suspension Control Mechanism>

The vehicle 1 may include suspension control mechanisms that reduce extension and contraction of the suspensions 33 and 35 (see FIG. 2). The suspension control mechanisms may be disposed inside the suspensions 33 and 35, for example. The suspensions 33 and 35 include inner cylinders 316 and 326 and outer cylinders 312 and 322. With extension and contraction of the suspensions 33 and 35, a flow of oil occurs in the suspensions. In the suspensions 33 and 35, orifices that are oil channels and regulating valves for regulating flow rates in the oil channels are provided. The suspension control mechanisms may be configured to control the regulating valves. An adjusting mechanism for adjusting the regulating valves may be mechanical or electric. In the case of mechanical adjusting mechanisms, each of the mechanisms may be configured to control the position of the regulating valve by using a motor or a solenoid, for example. In the case of an electric adjusting mechanism, the regulating valves may be electromagnetic regulating valves. Each of the suspension control mechanisms may have a configuration that adjusts a magnetic fluid viscosity with a solenoid.

The suspension control mechanisms may control the regulating valves based on a signal from the control section of the vehicle 1. The suspension control mechanisms control opening and closing of the regulating valves to thereby regulate the flow rates of oil in the suspensions 33 and 35. The suspension control mechanisms may suppress extension and contraction of the suspensions 33 and 35 by reducing the flow rates. The suspension control mechanisms may cancel suppression of extension and contraction of the suspensions 33 and 35 by increasing the flow rates. For example, when the regulating valves are closed, extension and contraction of the suspensions 33 and 35 are suppressed, whereas when the regulating valves are opened, suppression of extension and contraction of the suspensions 33 and 35 are canceled (operations of extension and contraction are allowed).

The configuration of the suspension control mechanisms is not limited to the above example. For example, suspension control mechanisms may be provided to the right rotation prevention mechanism 34 and the left rotation prevention mechanism 36. For example, in the configuration illustrated in FIG. 2, brake shoes may be provided to guide cylinders 313b and 323b in which the rotation prevention rods 341 and 361 are inserted. When the brake shoes are actuated, the brake shoes contact the rotation prevention rods 341 and 361 and lock relative movements of the rotation prevention rods 341 and 361 relative to the guide cylinders 313b and 323b. Each of the brake shoes may be actuated by an actuator such as a motor or a hydraulic actuator, for example. The actuator for the brake shoes may be attached to, for example, the body frame 21. The configuration of the brakes used as the suspension control mechanisms is not limited to the above example. For example, the brakes may have a configuration including a caliper or a configuration that restricts extension and contraction of the suspensions by breaking a parallel relationship between the extension/contraction direction of the rotation prevention mechanisms and the extension/contraction direction of the suspensions.

The suspension control mechanism is provided independently of the actuator 42 of the roll angle control mechanism 74. In addition to the actuator 42, an actuator for suppressing extension and contraction of the suspensions 33 and 35 is additionally provided. In this manner, the power source of the suspension control mechanism may be provided independently of the power source of the roll angle control mechanism 74. Accordingly, extension and contraction of the suspensions 33 and 35 may be controlled without constraint of roll angle control. In addition, the roll angle control may be performed independently of control of the extension and contraction of the suspensions 33 and 35.

<Steering Mechanism 7>

As illustrated in FIG. 2, the steering mechanism 7 includes the handlebar 23 and the steering force transfer mechanism 6. The steering force transfer mechanism 6 includes a steering shaft 60 and a tie rod 67. In the example illustrated in FIG. 2, the steering force transfer mechanism 6 also includes the brackets 317 and 327 and the suspensions 33 and 35. The steering force transfer mechanism 6 is rotatably supported on the head pipe 211 in a front portion of the body frame 21, integrally with the handlebar 23. The steering force transfer mechanism 6 changes the directions of the right wheel 31 and the left wheel 32 in accordance with rotation of the handlebar 23. That is, the steering force transfer mechanism 6 transfers a steering force with which a rider operates the handlebar 23, to the right wheel 31 and the left wheel 32 through the right bracket 317 and the left bracket 327.

The rotation axis Z of the steering shaft 60 extends in the top-bottom direction of the body frame 21. The handlebar 23 is attached to an upper portion of the steering shaft 60. The steering shaft 60 rotates about the rotation axis Z in accordance with an operation of the handlebar 23 by a rider. A part of the steering shaft 60 is rotatably supported on the head pipe 211. A lower portion of the steering shaft 60 is connected to the tie rod 67 extending in the left-right direction through an intermediate transfer plate 61. The intermediate transfer plate 61 is relatively non-rotatable with respect to the steering shaft 60. That is, the intermediate transfer plate 61 is rotatable together with the steering shaft 60 about the direction in which the steering shaft 60 extends.

The right end of the tie rod 67 is connected to the right bracket 317 through a right transfer plate 62. The right transfer plate 62 is rotatable together with the right side member 53 about the direction in which the right side member 53 extends.

The left end of the tie rod 67 is connected to the left bracket 327 through a left transfer plate 63. The left transfer plate 63 is rotatable together with the left side member 54 about the direction in which the left side member 54 extends.

Figure 4:
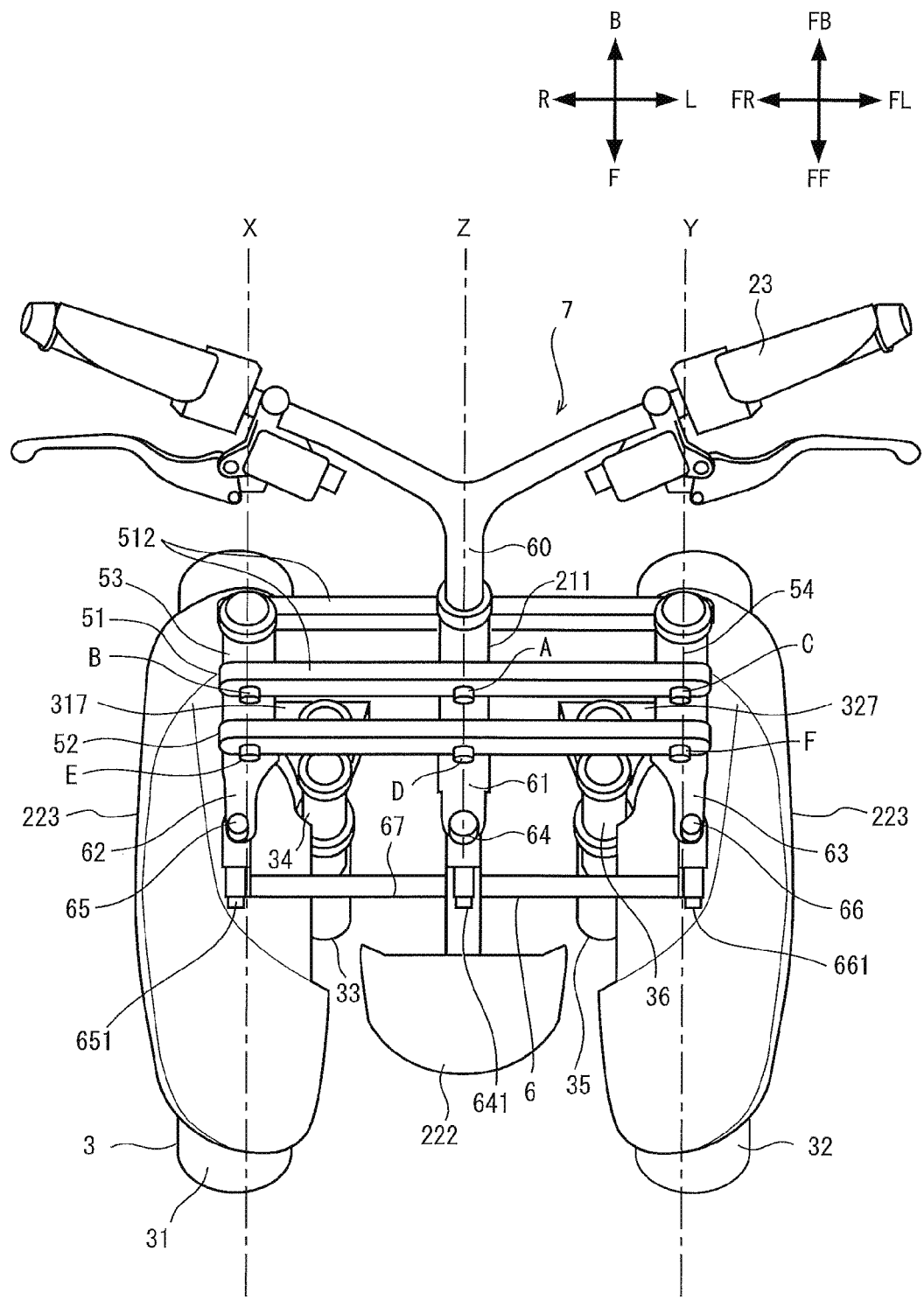
FIG. 4 is a plan view of a part of the vehicle illustrated in FIG. 1 when viewed from above.

FIG. 4 is a plan view of a front portion of the vehicle 1 when viewed from above the body frame 21. In FIG. 4, the body frame 21 is in the upright position. The following description with reference to FIG. 4 is based on a premise that the body frame 21 is in the upright position. FIG. 4 illustrates a state where the front cover 221 is detached. In FIG. 4, the direction in which the right side member 53 extends is defined as a right center axis X, and the direction in which the left side member 54 is defined as a left center axis Y. The right center axis X and the left center axis Y extend in parallel with the rotation axis Z of the steering shaft 60.

As illustrated in FIG. 4, the intermediate transfer plate 61, the right transfer plate 62, and the left transfer plate 63 are connected to the tie rod 67 through an intermediate front rod 641, a right front rod 651, and a left front rod 661, respectively. The intermediate front rod 641, the right front rod 651, and the left front rod 661 extend in the front-rear direction of the body frame 21, and are rotatable about the direction in which these rods extend. Accordingly, the intermediate front rod 641, the right front rod 651, and the left front rod 661 are connected to the tie rod 67 to be rotatable about an axis extending in the front-rear direction.

The intermediate front rod 641, the right front rod 651, and the left front rod 661 are connected to the intermediate transfer plate 61, the right transfer plate 62, and the left transfer plate 63 through an intermediate joint 64, a right joint 65, and a left joint 66, respectively. The intermediate front rod 641 is relatively rotatable about an axis parallel to the rotation axis Z with respect to the intermediate transfer plate 61. The right front rod 651 is relatively rotatable about an axis parallel to the right center axis X with respect to the right transfer plate 62. The left front rod 661 is relatively rotatable about an axis parallel to the left center axis Y with respect to the left transfer plate 63.

Figure 5:
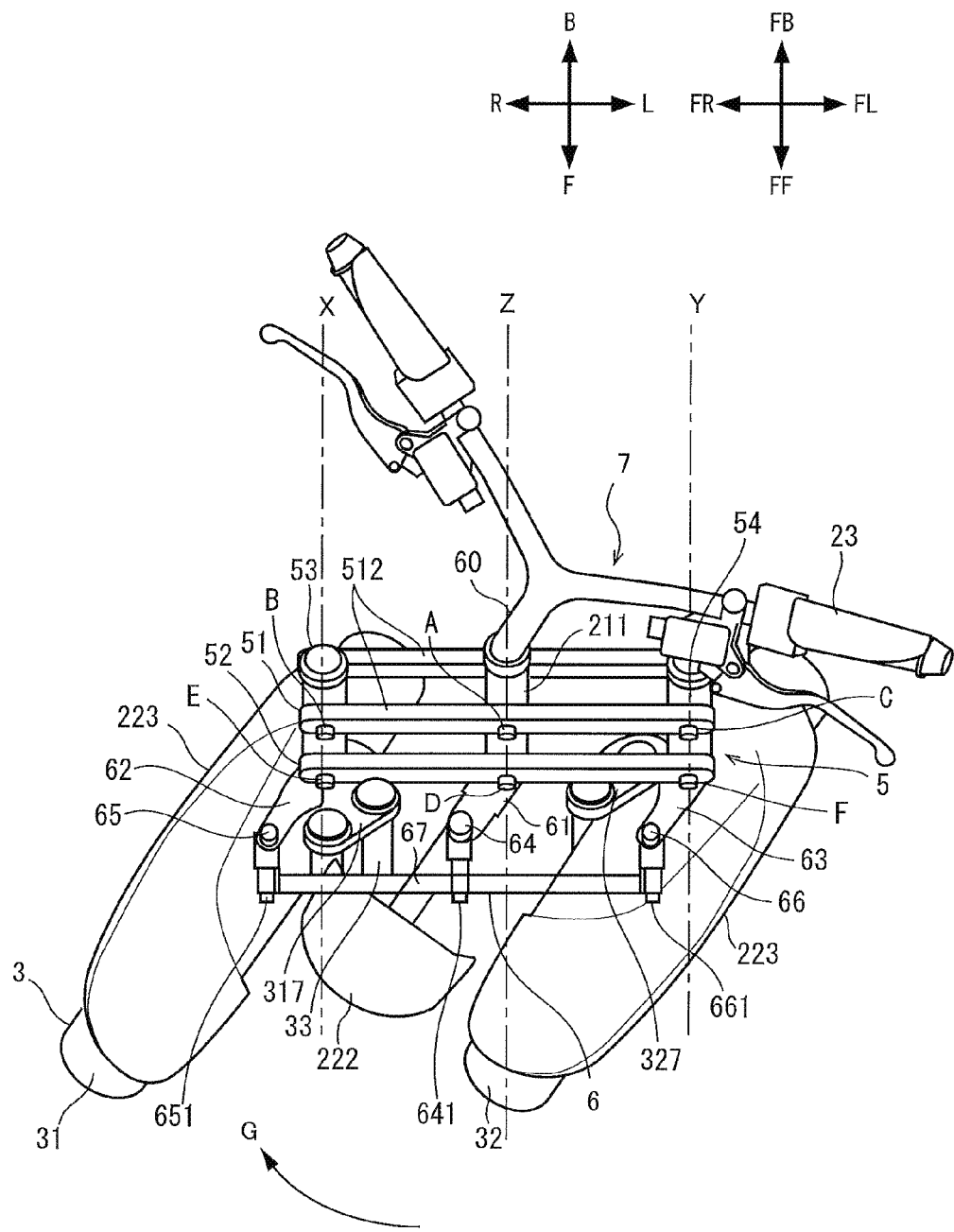
FIG. 5 is a plan view of a part of the vehicle illustrated in FIG. 1 in rightward steering when viewed from above.

FIG. 5 is a plan view of a front portion of the vehicle 1 when viewed from above the body frame 21 in a state where the right wheel 31 and the left wheel 32 are steered rightward.

When a rider operates the handlebar 23, the steering shaft 60 rotates about the rotation axis Z with respect to the head pipe 211. In the case of rightward steering illustrated in FIG. 5, the steering shaft 60 rotates in the direction of arrow G. With the rotation of the steering shaft 60, the intermediate transfer plate 61 rotates about the rotation axis Z in the direction of arrow G with respect to the head pipe 211.

With the rotation of the intermediate transfer plate 61 in the direction of arrow G, the intermediate front rod 641 of the tie rod 67 rotates about the intermediate joint 64 in the direction opposite to arrow G with respect to the intermediate transfer plate 61. Accordingly, the tie rod 67 moves right-rearward while maintaining its posture.

With the right-rearward movement of the tie rod 67, the right front rod 651 and the left front rod 661 of the tie rod 67 rotate about the right joint 65 and the left joint 66, respectively, in the direction opposite to arrow G. Accordingly, the right transfer plate 62 and the left transfer plate 63 rotate in the direction of arrow G while the tie rod 67 maintains its posture.

With the rotation of the right transfer plate 62 in the direction of arrow G, the right bracket 317, which is relatively non-rotatable with respect to the right transfer plate 62, rotates about the right center axis X in the direction of arrow G with respect to the right side member 53.

When the left transfer plate 63 rotates in the direction of arrow G, the left bracket 327, which is relatively non-rotatable with respect to the left transfer plate 63, rotates about the left center axis Y in the direction of arrow G with respect to the left side member 54.

When the right bracket 317 rotates in the direction of arrow G, the right suspension 33, which is connected to the right bracket 317 through the right inner cylinder 316, rotates about the right center axis X in the direction of arrow G with respect to the right side member 53. Accordingly, the right wheel 31 supported by the right suspension 33 rotates about the right center axis X in the direction of arrow G with respect to the right side member 53.

When the left bracket 327 rotates in the direction of arrow G, the left suspension 35, which is connected to the left bracket 327 through the left inner cylinder 326, rotates about the left center axis Y in the direction of arrow G with respect to the left side member 54. Accordingly, the left wheel 32 supported by the left suspension 35 rotates about the left center axis Y in the direction of arrow G with respect to the left side member 54.

As described above, the steering force transfer mechanism 6 transfers a steering force to the right wheel 31 and the left wheel 32 in accordance with an operation of the handlebar 23 by the rider. The right wheel 31 and the left wheel 32 rotate about the right center axis X and the left center axis Y, respectively, in the directions in accordance with the operation direction of the handlebar 23 by the rider.

<Tilt Operation of Vehicle 1>

Figure 6:
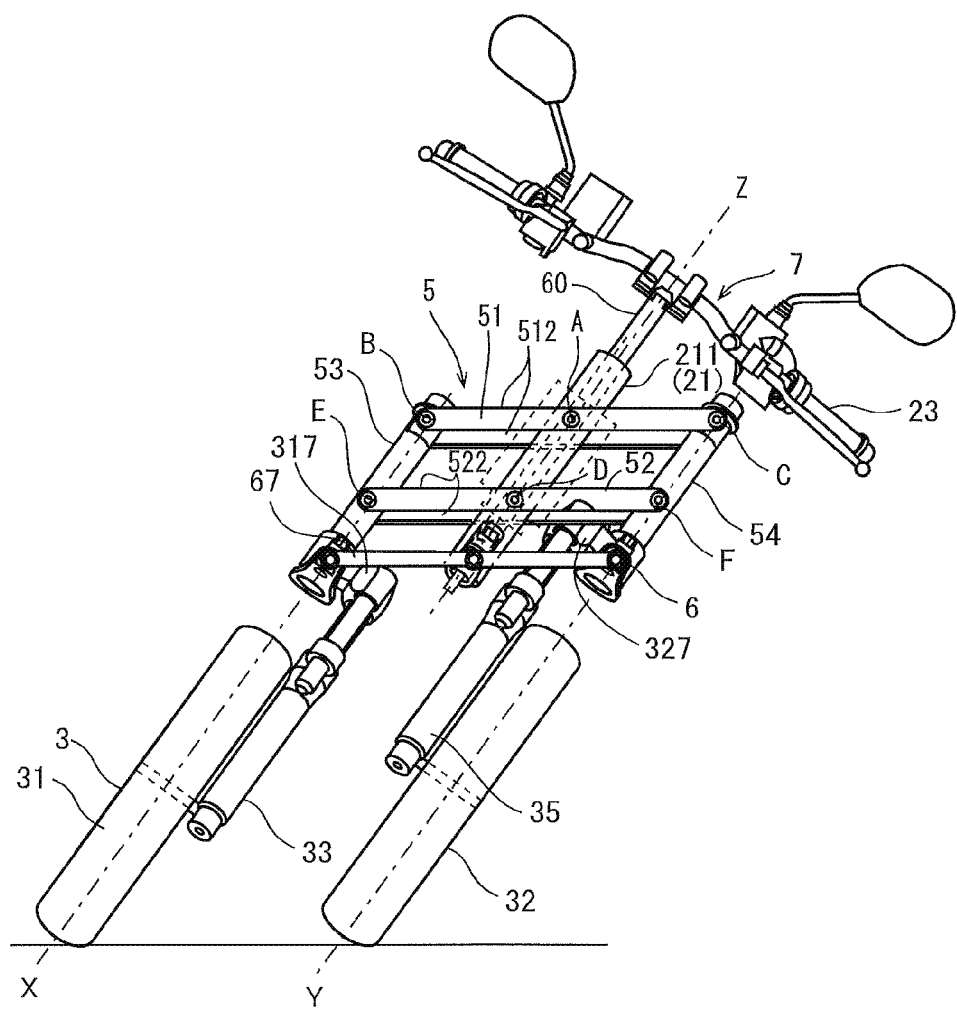
FIG. 6 is a front view of a part of the vehicle illustrated in FIG. 1 tilting leftward when viewed from the front.

Next, with reference to FIGS. 2 and 6, a tilt operation of the vehicle 1 will be described. FIG. 6 is a front view of a front portion of the vehicle 1 in a state where the body frame 21 tilts leftward when viewed from the front of the body frame 21.

As illustrated in FIG. 2, in the upright position of the body frame 21, the linkage mechanism 5 forms a rectangle when the vehicle 1 is viewed from the front of the body frame 21. As illustrated in FIG. 6, in the tilt state of the body frame 21, the linkage mechanism 5 forms a parallelogram when the vehicle 1 is viewed from the front of the body frame 21. The deformation of the linkage mechanism 5 is in conjunction with the tilt of the body frame 21 in the left direction or in the right direction. Actuation of the linkage mechanism 5 means that the upper arm 51, the lower arm 52, the right side member 53, and the left side member 54 constituting the linkage mechanism 5 relatively rotate about the rotation axes respectively passing through the support parts A through F thereof so that the linkage mechanism 5 is thereby deformed.

For example, as illustrated in FIG. 6, when the rider tilts the vehicle 1 leftward, the head pipe 211, that is, the body frame 21, tilts leftward relative to vertical direction. When the body frame 21 tilts, the upper arm 51 rotates about the axis passing through the support part A counterclockwise with respect to the body frame 21 when viewed from the rider. Similarly, the lower arm 52 rotates counterclockwise about the axis passing through the support part D. Accordingly, the upper arm 51 moves leftward relative to the lower arm 52.

With the leftward movement of the upper arm 51, the upper arm 51 rotates about the axis passing through the support part B and the axis passing through the support part C counterclockwise with respect to the right side member 53 and the left side member 54, respectively. Similarly, the lower arm 52 rotates about the axis passing through the support part E and the axis passing through the support part F counterclockwise with respect to the right side member 53 and the left side member 54, respectively. Accordingly, the right side member 53 and the left side member 54 tilt leftward relative to the vertical direction while maintaining a posture parallel to the body frame 21.

At this time, the lower arm 52 moves leftward relative to the tie rod 67. With the leftward movement of the lower arm 52, the intermediate front rod 641, the right front rod 651, and the left front rod 661 of the tie rod 67 rotate with respect to the tie rod 67. Accordingly, the tie rod 67 maintains a posture parallel to the upper arm 51 and the lower arm 52.

With the leftward tilt of the right side member 53, the right wheel 31, which is connected to the right side member 53 through the right bracket 317 and the right suspension 33, tilts leftward while maintaining a posture parallel to the body frame 21.

With the leftward tilt of the left side member 54, the left wheel 32, which is connected to the left side member 54 through the left bracket 327 and the left suspension 35, tilts leftward while maintaining a posture parallel to the body frame 21.

The tilt operations of the right wheel 31 and the left wheel 32 have been described with respect to the vertical direction. In a tilt operation of the vehicle 1 (in actuation of the linkage mechanism 5), the top-bottom direction of the body frame 21 does not coincide with the vertical direction. In the case where the description is given with respect to the top-bottom direction of the body frame 21, in actuation of the linkage mechanism 5, relative positions of the right wheel 31 and the left wheel 32 relative to the body frame 21 are changed. In other words, the linkage mechanism 5 tilts the body frame 21 relative to the vertical direction by changing the relative positions of the right wheel 31 and the left wheel 32 relative to the body frame 21 in the top-bottom direction of the body frame 21.

<System Configuration>

Figure 7:
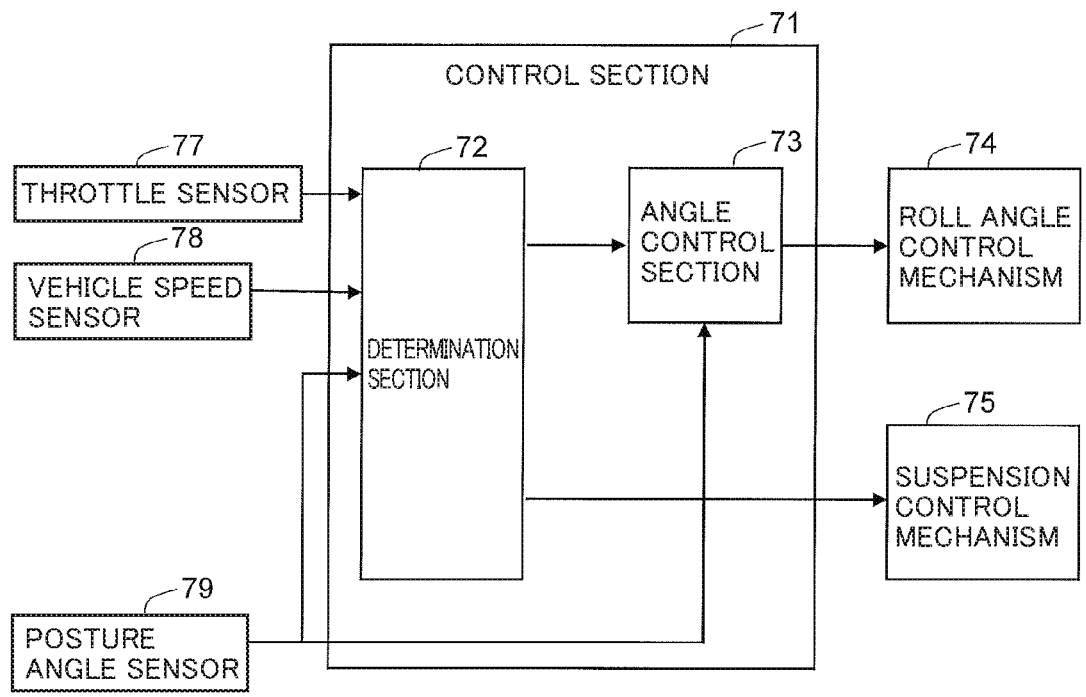
FIG. 7 is a block diagram illustrating an example configuration of a control system of the vehicle according to the embodiment.

FIG. 7 is a block diagram illustrating an example configuration of a control system of the vehicle 1. In the example illustrated in FIG. 7, the control section 71 controls a roll angle control mechanism 74 and a suspension control mechanism 75 based on information indicating a vehicle state. The control section 71 is connected to the roll angle control mechanism 74 and the suspension control mechanism 75 wirelessly or by wire. For example, the control section 71 is configured to enable transmission of a control signal to a driving unit of the roll angle control mechanism 74 and a driving unit of the suspension control mechanism 75. The driving unit of the roll angle control mechanism 74 may be, for example, a driving unit or the like of the actuator 42 of the roll angle control mechanism 74. The driving unit of the suspension control mechanism 75 may be, for example, an actuator, an attenuating circuit, or another component of the suspension control mechanism 75.

The control section 71 is connected to a sensor for detecting a state of the vehicle 1 wirelessly or by wire. The control section 71 receives information indicating the state of the vehicle 1 from the sensor. In the example illustrated in FIG. 7, a throttle sensor 77, a vehicle speed sensor 78, and a posture angle sensor 79 are connected to the control section 71.

<Sensor>

The throttle sensor 77 sends a signal in accordance with a throttle opening degree of the vehicle 1 to the control section 71. The throttle sensor 77 is attached to the engine of the vehicle 1, for example, and detects a throttle opening degree of a throttle valve of the engine.

The vehicle speed sensor 78 sends a signal in accordance with a traveling speed of the vehicle 1 to the control section 71. The vehicle speed sensor 78 may detect a rotation speed of the wheel. In this case, the vehicle speed sensor 78 is attached to, for example, an axle of the front wheels 3 or the rear wheel 4 or an output shaft of a transmission, and sends a signal in accordance with the rotation speed of the wheel to the control section 71.

The posture angle sensor 79 sends a signal in accordance with a roll angle of the body frame 21 to the control section 71. For example, the posture angle sensor 79 may be a gyroscope for detecting a roll angular velocity and a roll angle of the body frame 21. The gyroscope may be a three-axis gyroscope for detecting angular velocities or angles of a yaw angle and a pitch angle in addition to the roll angle. The posture angle sensor 79 is not limited to a gyroscope. For example, the posture angle sensor 79 may be an acceleration sensor, a sensor for detecting rotation angles, angular velocities, or torques of the arms 51 and 52 with respect to body frame 21, or a sensor for detecting an angle of a pendulum hanging from the body frame 21, or a combination of at least these two sensors.

Sensors connected to the control section 71 are not limited to the above example. For example, the control section 71 may receive information from an acceleration sensor in three-axis directions, an angular acceleration sensor for three axes, a steering angle sensor, a steering torque sensor, an engine torque sensor, an engine revolution speed sensor, a seat pressure sensor, or a stroke sensor for detecting the operation amount of a brake, for example.

<Control Section>

The control section 71 includes a determination section 72 and an angle control section 73. The determination section 72 determines control of the roll angle and control of extension and contraction of the suspensions based on information acquired from the group of the sensors 77 through 79 and indicating the vehicle state. The angle control section 73 controls the roll angle control mechanism based on the roll angle control determined by the determination section 72 and the roll angle of the body frame 21 detected by the posture angle sensor 79.

The determination section 72 determines whether roll angle control during traveling toward stop is necessary or not based on information acquired from at least one of the group of the sensors 77 through 79 and indicating the vehicle state. This determination includes determination of start or cancel of roll angle control during traveling toward stop. For example, the determination section 72 may determine whether roll angle control during traveling toward stop is necessary or not based on predetermined conditions for the vehicle state. If the vehicle state satisfies a first condition, for example, the determination section 72 may determine to start roll angle control during traveling toward stop, whereas if the vehicle state satisfies a second condition, the determination section 72 may determine to cancel the roll angle control.

The state of "during traveling toward stop" is, for example, a traveling state determined to be highly probably stopped within several seconds. Determination on whether the vehicle is traveling toward stop or not is based on, for example, whether the vehicle speed is below a predetermined threshold or not. If the vehicle 1 shows a behavior of traveling toward stop, the determination section 72 determines to perform roll angle control during traveling toward stop. Accordingly, in a case where the vehicle increases the speed again from a decelerated state for stop, for example, the determination section 72 might determine to perform roll angle control during traveling toward stop in some cases.

The roll angle control during traveling toward stop may be, for example, control of causing the roll angle to approach a set target value. In this case, the target value may be a predetermined value or a value determined based on the vehicle state. The determination section 72 may determine this target value. The target value is a roll angle suitable for a state during traveling toward stop, and may be, for example, a roll angle at which the body frame 21 is in the upright position.

The roll angle control during traveling toward stop is not limited to a mode of controlling the roll angle to the target value. For example, the roll angle control may be, for example, control of reducing an angular velocity or an angle range with which the roll angle changes.

The determination section 72 determines whether extension and contraction of the suspensions 33 and 35 are necessary or not based on information indicating the vehicle state and acquired from at least one of the group of the sensors 77 through 79. This necessity determination includes determination on start or cancel of suppression of extension and contraction of the suspensions 33 and 35. For example, it may be determined whether suppression of extension and contraction of the suspensions 33 and 35 based on predetermined conditions of the vehicle state. If the vehicle state satisfies a third condition, for example, the determination section 72 determines to start suppression of extension and contraction of the suspensions 33 and 35, whereas if the vehicle state satisfies a fourth condition, the determination section 72 determines to cancel suppression of extension and contraction of the suspensions 33 and 35.

The suppression of extension and contraction of the suspensions 33 and 35 may be a mode of locking to prevent extension and contraction of the suspensions 33 and 35, for example. Alternatively, the suppression of extension and contraction of the suspensions 33 and 35 may be a mode of applying a resistance against a force for extension and contraction of the suspensions 33 and 35 or a mode of increasing such a resistance.

In at least a part of the roll angle control period during traveling toward stop, the determination section 72 may determine to reduce extension and contraction of the suspensions 33 and 35. That is, the first through fourth conditions may be set in such a manner that extension and contraction of the suspensions 33 and 35 are suppressed in at least a part of a period in which the roll angle control during traveling toward stop is performed. For example, by making the first condition and the third conditions the same, the determination section 72 may determine to start roll angle control during traveling toward stop and suppression of extension and contraction of the suspensions 33 and 35 at the same time. Alternatively, by making the first condition and the third condition different from each other, the determination section 72 may start suppression of extension and contraction of the suspensions 33 and 35 and start roll angle control during traveling toward stop at different times. Alternatively, the determination section 72 may include start of roll angle control during traveling toward stop in a condition for start of suppression of extension and contraction of the suspensions.

As an example, the first condition for starting roll angle control may include a condition that the vehicle speed is a threshold Th2 or less, and the third condition for starting suppression of extension and contraction of the suspensions may include a condition that the vehicle speed is a threshold Th1 or less. In this case, the control section 71 may perform control of causing the suspension control mechanism 75 to suppress extension and contraction of the suspensions 33 and 35 in a period in at least a part of a period in which the vehicle speed of the vehicle 1 is in a low-speed traveling range and in at least a part of a period in which the roll angle control mechanism 74 performs roll angle control. This control allows the period in which the vehicle speed of the vehicle 1 is in the low-speed traveling range to include a period in which control of the roll angle by the roll angle control mechanism 74 and suppression of extension and contraction of the suspensions 33 and 35 are performed at the same time.

Here, the low-speed traveling range refers to a range in which the vehicle speed of the vehicle 1 is lowest among a plurality of ranges obtained by dividing the entire vehicle-speed range except for a stopped state. That is, the entire vehicle-speed range of the vehicle 1 except for the stopped state may be divided into a high-speed traveling range and the low-speed traveling range. The low-speed traveling range may be set as a range where the vehicle speed v is higher than zero and is lower than an upper limit VLu (i.e., $0<v<VLu$). In this case, the high-speed traveling range is a range where the vehicle speed v is VLu or more and is a maximum speed Vmax of the vehicle 1 or less (i.e., $VLu \leq v \leq Vmax$). The upper limit VLu of the low-speed traveling range is not limited to a specific value, and, for example, is set at a value depending on the type of the vehicle. The low-speed traveling range may be, for example, a vehicle speed range in which the vehicle may be determined to be traveling toward stop. Both the thresholds Th1 and Th2 of the vehicle speed described above are included in the low-speed traveling range. The threshold Th1 and the threshold Th2 may be the same or different from each other.

The determination section 72 may perform determination in such a manner that the roll angle control during traveling toward stop continues after stop of the vehicle. For example, the second condition may be set not to cancel the roll angle control during traveling toward stop even when the vehicle 1 stops. For example, a condition in which the vehicle speed exceeds a predetermined threshold may be included in the second condition. In this case, if the vehicle 1 stops and then starts traveling so that the vehicle speed exceeds the threshold, the determination section 72 may determine to cancel roll angle control during traveling toward stop.

The determination section 72 may still continue suppression of extension and contraction of the suspensions after stop of the vehicle. For example, the fourth condition may be set in such a manner that suppression of extension and contraction of the suspensions is not canceled even when the vehicle 1 stops. For example, a condition in which the vehicle speed exceeds a predetermined threshold may be included in the fourth condition. In this case, if the vehicle 1 stops and then starts traveling so that the vehicle speed exceeds the threshold, the determination section 72 may determine to cancel suppression of extension and contraction of the suspensions.

The determination section 72 may determine whether roll angle control during traveling toward stop is necessary or not and whether suppression of extension and contraction of the suspensions is necessary or not, by using a plurality of parameters indicating a vehicle state. The plurality of parameters indicating the vehicle state are determined based on information obtained from the sensors 77 through 79. The determination section 72 compares the parameters indicating the vehicle state with thresholds to thereby perform the determinations described above. These thresholds are data indicating the first through fourth conditions. The thresholds may be recorded in a storage unit (e.g., memory) of the control section 71 beforehand. That is, the control section 71 may store data indicating the first through fourth conditions beforehand. The determination section 72 may change the thresholds depending on the vehicle state.

A combination of parameters used for determining whether roll angle control during traveling toward stop is necessary or not may be different from a combination of parameters used for determining whether suppression of extension and contraction of the suspensions is necessary or not. At least one parameter used for determining whether roll angle control during traveling toward stop is necessary or not may be the same as a parameter used for determining whether suppression of extension and contraction of the suspensions is necessary or not. In this case, a threshold of the parameter used for determining whether roll angle control during traveling toward stop is necessary or not may be different from a threshold of the parameter used for determining whether suppression of extension and contraction of the suspensions is necessary or not.

As an example, a combination of parameters used for determining start of roll angle control during traveling toward stop may be constituted by the vehicle speed, the throttle opening degree, and the roll angle, and a combination of parameters used for determining start of suppression of extension and contraction of the suspensions may be constituted by only the vehicle speed. In this example, a threshold of the vehicle speed used for determining start of roll angle control during traveling toward stop may be different from a threshold of the vehicle speed used for determining start of suppression of extension and contraction of the suspensions.

In this example, the determination section 72 acquires information indicating the vehicle state from the sensors. Based on the information indicating the vehicle state, the determination section 72 determines cancellation of control of the roll angle by the roll angle control mechanism 74 and cancellation of suppression of extension and contraction of the suspensions by the suspension control mechanism 75. In this case, from the information indicating the vehicle state, the determination section 72 may acquire information on at least one of a rider's intention of causing the vehicle 1 to travel or a rider's intention of canceling roll angle control or suppression of motion of the suspensions.

The determination section 72 may determine a rider's intention of causing the vehicle 1 to travel based on information on at least one of the throttle, the brake, or the vehicle speed. In this case, each of the second condition and the fourth condition includes a condition of at least one of the throttle opening degree, whether a brake operation is performed or not or the amount of the brake operation, and the vehicle speed. The condition included is, for example, that the amount of change in at least one of a throttle opening degree, a brake operation, and a vehicle speed detected by the sensors exceeds a threshold. Accordingly, based on information indicating a rider's intention of causing the vehicle 1 to travel, it may be determined whether cancellation of roll angle control or suppression of extension and contraction of the suspensions is necessary or not.

Alternatively, the vehicle 1 may include an operation device, such as a button, for receiving a cancellation instruction of roll angle control and/or suppression of extension/contraction of the suspensions from the rider. In this case, the determination section 72 detects an input of the cancellation instruction through the operation device. Accordingly, it is possible to acquire information indicating a rider's intention of canceling roll angle control or suppression of movement of the suspensions.

If the determination section 72 determines that roll angle control during traveling toward stop is performed, the angle control section 73 determines control of rotations of the arms 51 and 52 based on the roll angle of the body frame 21 detected by the posture angle sensor 79. The angle control section 73 determines the magnitude and direction of a rotary force as control of rotation, and outputs the magnitude and direction to the roll angle control mechanism 74. For example, the angle control section 73 may determine the magnitude and direction of the rotary force applied to the arms 51 and 52 based on a target value of the roll angle and the roll angle detected by the posture angle sensor 79. Accordingly, an actual roll angle of the body frame 21 may be fed back to control by the roll angle control mechanism.

For example, the angle control section 73 may determine the rotation direction of the arms 51 and 52 that reduces the difference between the target value of the roll angle and the roll angle detected by the posture angle sensor 79, as the direction of a rotation to be applied. The angle control section 73 may determine a magnitude of the rotary force to be applied in accordance with the difference between the target value of the roll angle and the roll angle detected by the posture angle sensor 79. The angle control section 73 may also determine the magnitude of a rotary force to be applied based on a torque to rotation of the arms 51 and 52 with respect to the body frame 21.

The control of the angle control section 73 is not limited to the control of reducing the difference between the roll angle detected by the posture angle sensor 79 and the target value of the roll angle. The angle control section 73 may determine, for example, an instruction value of a motor of an actuator by using a rotation speed or a torque of the arms with respect to the body frame and a current value of the motor.

In this embodiment, the control section 71 acquires information indicating the vehicle state including the vehicle speed of the vehicle 1 from sensors provided in the vehicle 1. Based on the vehicle state, the control section 71 determines whether the roll angle of the body frame is controlled or not. For example, if the vehicle speed is in at least a part of the low-speed traveling range (e.g., if the vehicle speed v is the threshold Th2 or less (i.e., v≤Th2)), the control section 71 determines to control roll angle. Based on this determination result, the control section 71 supplies a control signal or control data to an actuator of the roll angle control mechanism 74. The actuator outputs a force for rotating the arms with respect to the body frame or a force against rotation of the arms with respect to the body frame, in accordance with the control signal or the control data.

The control section 71 determines whether to suppress extension and contraction of the suspensions based on the vehicle state. For example, if the vehicle speed is in at least a part of the low-speed traveling range (e.g., the vehicle speed v is the threshold Th1 or less (i.e., v≤Th1)), the control section 71 determines to suppress extension and contraction of the suspensions. Based on this determination result, the control section 71 supplies a control signal or control data to the suspension control mechanism 75. The suspension control mechanism 75 suppresses extension and contraction of the suspensions in accordance with the control signal or the control data.

In the low-speed traveling range, at least a part of a vehicle speed range determined to be a range in which the roll angle is controlled overlaps with at least a part of a vehicle speed range determined to be a range in which extension and contraction of the suspensions is suppressed. Accordingly, in at least a part of a period in which the vehicle speed of the vehicle 1 is in at least a part of the low-speed traveling range and the roll angle is controlled by the roll angle control mechanism 74, the suspension control mechanism 75 suppresses extension and contraction of the suspensions. The process of determining whether to suppress the suspensions by the control section 71 is not limited to this example. For example, the control section 71 may control the suspensions, based on the vehicle speed and information indicating whether roll angle control by the roll angle control mechanism is performed or not.

The control section 71 may be constituted by an electronic control unit (ECU). The control section 71 may be constituted by a computer including a processor and a memory or a circuit formed on a board. In the case where the control section 71 is constituted by a computer, the process of the control section 71 is, for example, implemented by reading and executing a program from a memory with the processor. Such a program and a non-transitory recording medium in which the program is recorded are also included in the embodiment of the present teaching.

The configuration of the control section 71 is not limited to the example illustrated in FIG. 7. For example, the determination section 72 and the angle control section 73 may be constituted by computers independently of each other or circuits formed on different boards. For example, the angle control section 73 may be incorporated in a part of the roll angle control mechanism 74.

<Operation Example>

Figure 8:
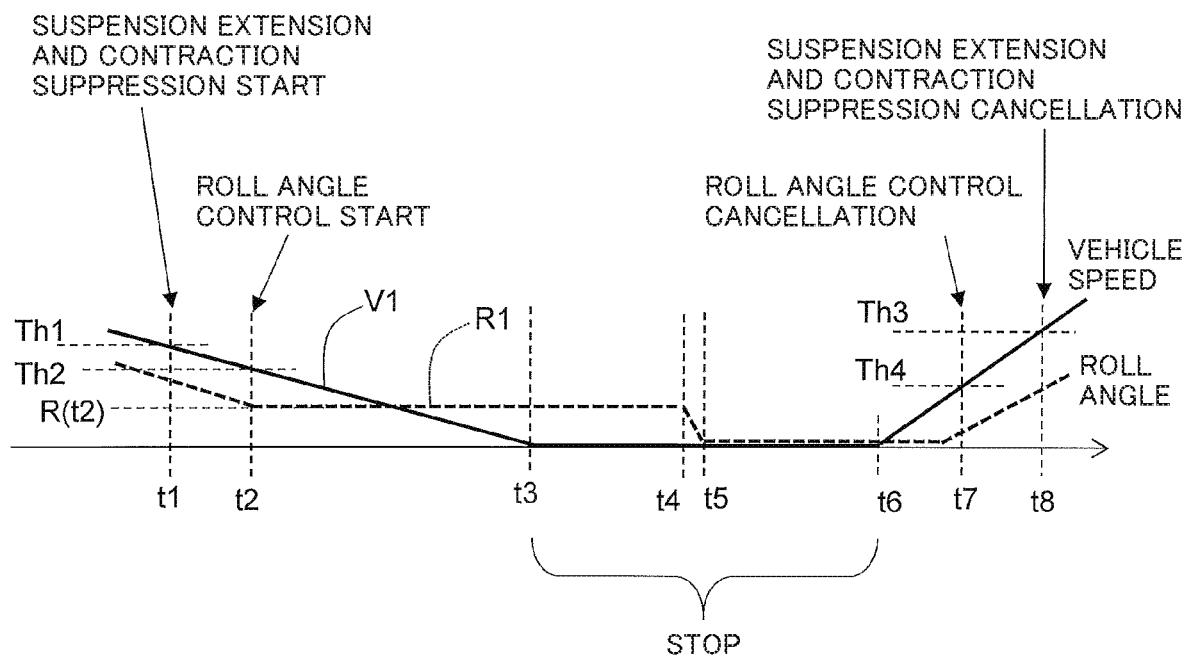
FIG. 8 is a timing chart demonstrating an example of control of a roll angle and suspensions by the control section illustrated in FIG. 7.

FIG. 8 is a timing chart demonstrating an example of control of a roll angle and a suspension by the control section 71 illustrated in FIG. 7. In FIG. 8, the abscissa represents time. The ordinate represents the vehicle speed or the roll angle. The line V1 represents a change in the vehicle speed over time, and line R1 represents a change in a roll angle over time. The threshold Th1 represents a threshold of the vehicle speed for use in determining start of suppression of extension and contraction of the suspensions (an example of the third condition). The threshold Th2 represents a threshold of the vehicle speed for use in determining whether to start roll angle control during traveling toward stop (an example of the first condition). The threshold Th3 represents a threshold of a vehicle speed for use in determining whether to cancel suppression of extension and contraction of the suspensions (an example of the fourth condition). The threshold Th4 represents a threshold of the vehicle speed for use in determining whether to cancel roll angle control during traveling toward stop (an example of the second condition).

In the example shown in FIG. 8, when the vehicle speed decreases below the threshold Th1 at time t1, the determination section 72 determines start of suppression of extension and contraction of the suspensions. At time t1, the control section 71 issues an instruction of suppressing extension and contraction of the suspensions to the suspension control mechanism 75. The suspension control mechanism 75 locks the suspensions to prevent the suspensions from extending and contracting.

At time t2, when the vehicle speed decreases below the threshold Th2, the determination section 72 determines to start roll angle control during traveling toward stop. Although not shown, it is assumed that at time t2, the throttle opening degree and the roll angle have already satisfied the condition for starting roll angle control during traveling toward stop (first condition). At time t2, the control section 71 instructs the roll angle control mechanism 74 to control the roll angle during traveling toward stop. In this example, since Th1>Th2, after the start of suppression of extension and contraction of the suspensions, roll angle control during traveling toward stop starts.

The determination section 72 sets a roll angle R(t2) at time t2 as a target value of the roll angle during traveling toward stop. The angle control section 73 compares the roll angle R(t2) with a roll angle Rs detected by the posture angle sensor 79. If the signs (positive (+) or negative (−)) of R(t2) and Rs are the same and |R(t2)|<|Rs|, the angle control section 73 determines a rotary force of the arms 51 and 52 in such a manner that Rs=R(t2) is established. Here, as an example, a roll angle in a state where the top-bottom direction of the body frame 21 coincides with the vertical direction (gravity direction) is defined as zero degrees. A roll angle in a state where the body frame 21 tilts rightward with respect to the vertical direction is defined as positive (+), and a roll angle in a state where the body frame 21 tilts leftward with respect to the vertical direction is defined as negative (−). In this manner, at and after time t2, the roll angle is kept at R(t2).

In this example, since the threshold Th3>0, if the vehicle speed is zero, it is determined that the condition for starting roll angle control during traveling toward stop (first condition) is satisfied and the condition for canceling the roll angle control (second condition) is not satisfied. Similarly, since the threshold Th4>0, if the vehicle speed is zero, it is determined that the condition for starting suspension suppression control (third condition) is satisfied and the condition for canceling the suspension suppression control (fourth condition) is not satisfied. Thus, after the vehicle 1 stops at time t3, roll angle control and suppression of extension and contraction of the suspensions during traveling toward stop still continue.

Figure 9:
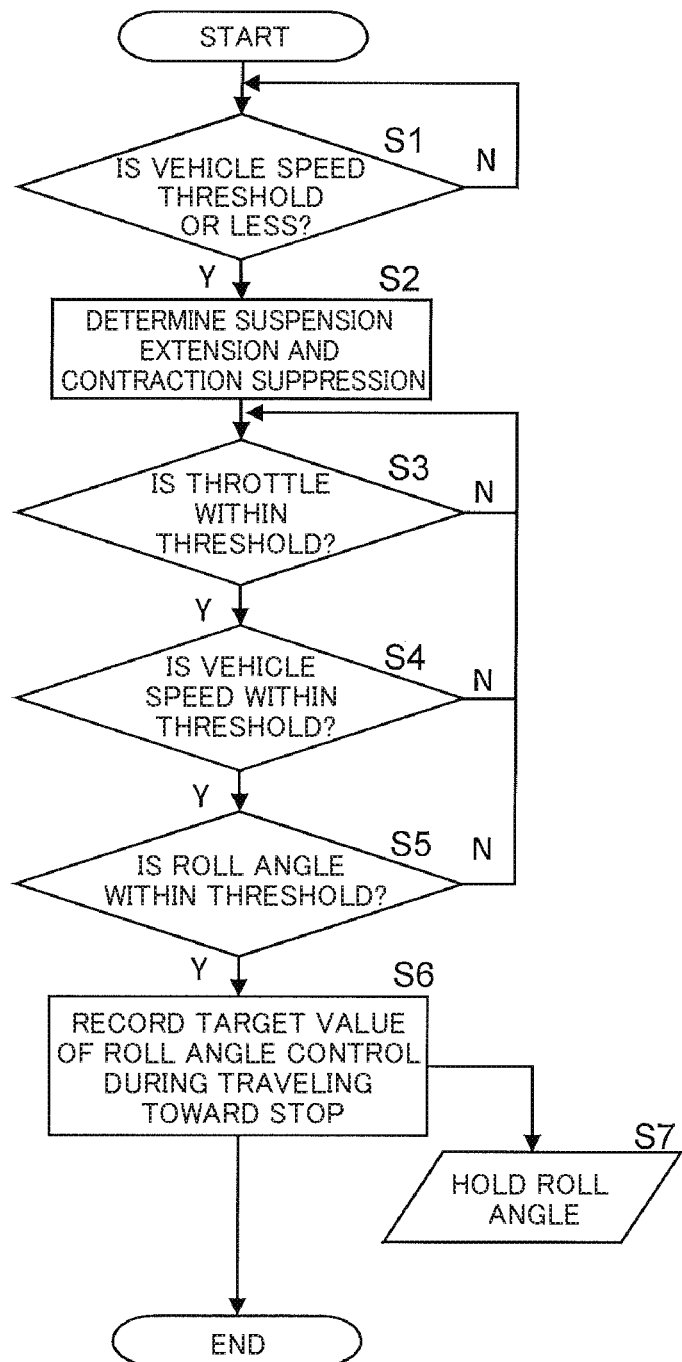
FIG. 9 is a flowchart depicting an example process in which a determination section determines start of roll angle control and suppression of extension and contraction of the suspensions.

FIG. 9 is a flowchart depicting an example process in which the determination section 72 determines whether to start roll angle control and suppression of extension and contraction of the suspensions during traveling toward stop. The determination section 72 determines whether or not the vehicle speed is a threshold or less (S1). If the vehicle speed is the threshold or less, the determination section 72 determines to start suppression of extension and contraction of the suspensions (S2). The determination section 72 determines whether or not each of the throttle opening degree, the vehicle speed, and the roll angle is within a threshold, inclusive (S3 through S5). If each of the throttle opening degree, the vehicle speed, and the roll angle is within the threshold, inclusive, the determination section 72 determines start of roll angle control during traveling toward stop (S6). The determination section 72 records a roll angle (R(t2) in the example of FIG. 8) when start of the roll angle control is determined in the memory as a target value. The angle control section 73 issues an instruction to the roll angle control mechanism 74 so as to hold the roll angle of the body frame 21 at the target value (S7). The process in FIG. 9 may be executed by the determination section 72 in predetermined cycles.

With reference to FIG. 8 again, suppose at time t4, a rider performs an operation of causing a tilt of the vehicle 1 in the left direction or in the right direction to approach zero degrees with respect to the vertical direction (gravity direction). In this case, the control section 71 controls the roll angle control mechanism 74 in such a manner that the roll angle of the body frame 21 approaches zero degrees in accordance with the operation of the rider. Accordingly, the roll angle changes to approach zero degrees by an amount in accordance with the rider's operation (time t5). The control section 71 sets a roll angle after the change in accordance with the rider's operation as a new target value. Accordingly, in the roll angle control during traveling toward stop, the roll angle control mechanism may control the roll angle so as to permit motion of causing the tilt of the vehicle 1 to approach the upright position by a rider's operation.

Figure 10:
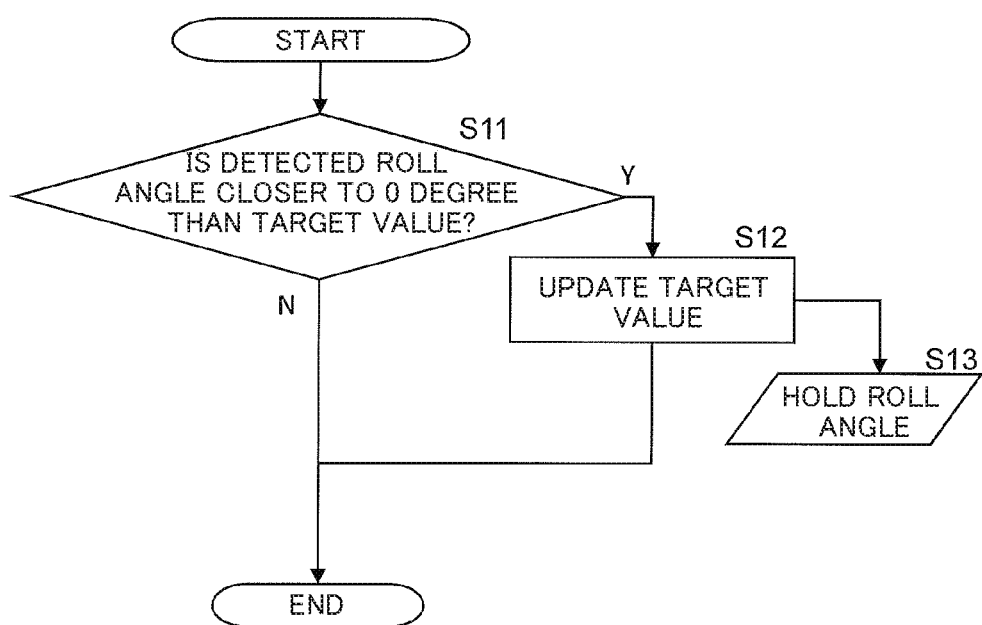
FIG. 10 is a flowchart depicting an example process in which the control section updates a target value of the roll angle.

FIG. 10 is a flowchart depicting a process in which the control section 71 updates a target value of the roll angle. The control section 71 (the determination section 72 or the angle control section 73) determines whether the roll angle Rs of the body frame 21 acquired from the posture angle sensor 79 is closer to the zero degrees than the set target value (R(t2) in the example of FIG. 8) or not (S11). For example, the control section 71 determines whether |R(t2)|>|Rs| or not. If YES in S11, the control section 71 updates the target value to the roll angle Rs acquired from the posture angle sensor 79 (S12). The angle control section 73 issues an instruction to the roll angle control mechanism 74 so that the roll angle of the body frame 21 is held at the updated target value (S13). The control section 71 may repeatedly perform the process of FIG. 10 at predetermined intervals in a period in which roll angle control during traveling toward stop is performed.

With reference to FIG. 8 again, the vehicle 1 starts traveling at time t6. After the start of traveling of the vehicle 1, when the vehicle speed exceeds the threshold Th4 at time t7, the determination section 72 determines to cancel roll angle control during traveling toward stop. At time t7, the control section 71 instructs cancellation of roll angle control during traveling toward stop to the roll angle control mechanism 74.

When the vehicle speed exceeds the threshold Th3 at time t8, the determination section 72 determines cancellation of suspension suppression control. At time t8, since Th3>Th4 in this example, after cancellation of roll angle control during traveling toward stop, suppression of extension and contraction of the suspensions is canceled.

Figure 11:
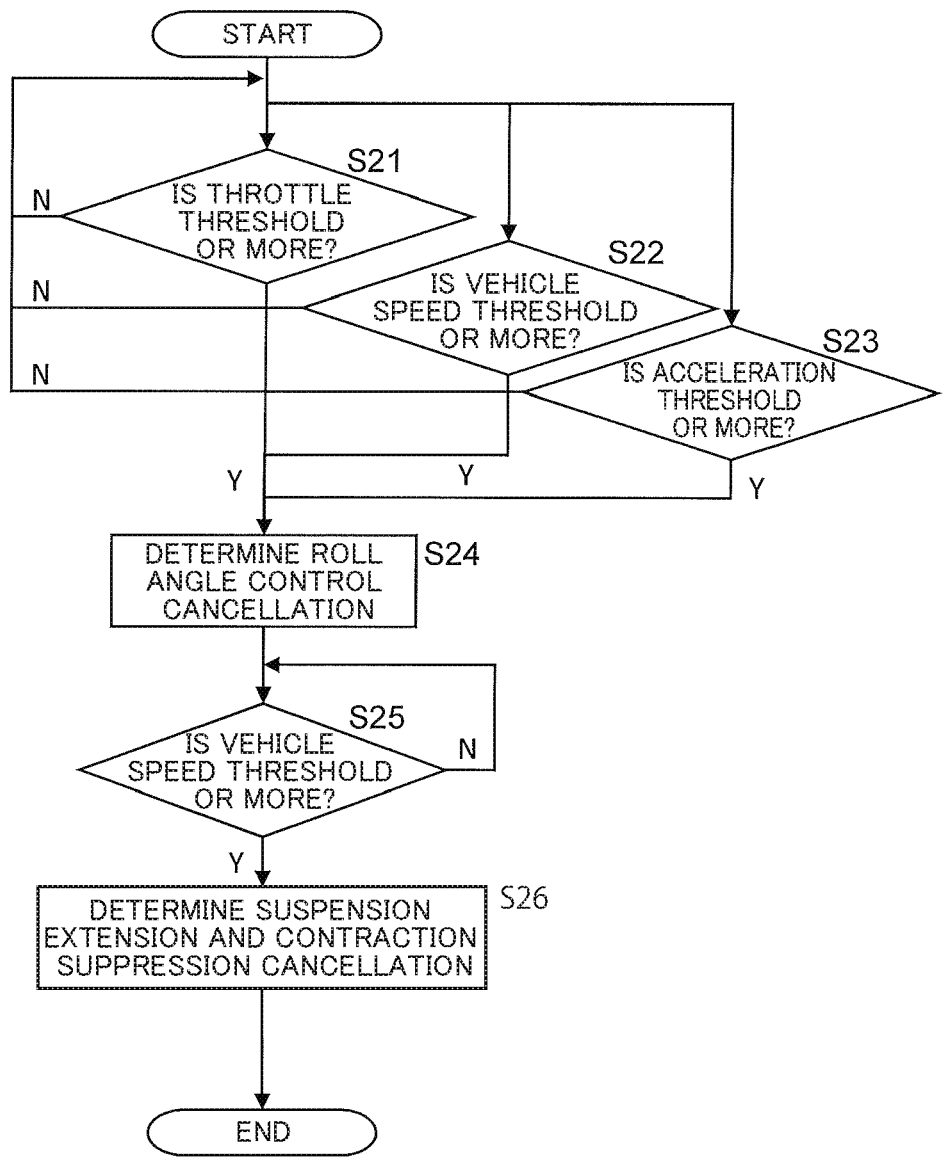
FIG. 11 is a flowchart depicting an example process in which the determination section determines cancellation of the roll angle control and the suppression of extension and contraction of the suspensions.

FIG. 11 is a flowchart depicting an example process in which the determination section 72 determines to cancel roll angle control and suppression of extension and contraction of the suspensions during traveling toward stop. The determination section 72 determines whether or not at least one of the throttle opening degree, the vehicle speed, or the acceleration is at or above a threshold (S21 through S23). For example, if the vehicle speed exceeds a threshold (Th3 in the example of FIG. 8), the determination section 72 determines to cancel roll angle control during traveling toward stop (S24). The determination section 72 determines whether or not the vehicle speed is a threshold (Th4 in the example of FIG. 8) or less (S25). If the vehicle speed is at or above the threshold, the determination section 72 determines to cancel suppression of extension and contraction of the suspensions (S26). In the example of FIG. 11, if it is determined that the condition for canceling roll angle control during traveling toward stop is satisfied, determination of canceling suppression of extension and contraction of the suspensions is executed. Thus, after cancellation of roll angle control during traveling toward stop, cancellation of suppression of extension and contraction of the suspensions is executed.

In the operation example of FIG. 8, extension and contraction of the suspensions are suppressed in a period in which roll angle control during traveling toward stop is performed (t2 through t7). Accordingly, in the period in which roll angle control during traveling toward stop is performed, the responsiveness of the roll angle of the body frame to adjustment of rotations of the arms 51 and 52 by the roll angle control mechanism 74 is high. Thus, in traveling toward stop, movement of the roll angle of the body frame 21 controlled by the roll angle control mechanism 74 may be easily converged. As a result, the roll angle may be controlled depending on various possible situations occurring during traveling toward stop.

In addition, even in a case where extension and contraction of the suspensions 33 and 35 is suppressed while the vehicle 1 is traveling toward stop, the linkage mechanism 5 of the vehicle 1 absorbs movement of the right wheel 31 and the left wheel 32 in the top-bottom direction with respect to the body frame 21. Accordingly, an increase in vibrations of the body frame caused by suppression of extension and contraction of the suspensions 33 and 35 during traveling toward stop may be reduced.

In the example of FIG. 8, extension and contraction of the suspensions are suppressed in the entire period in which roll angle control during traveling toward stop is performed (t2 through t7). Alternatively, extension and contraction of the suspension may be suppressed in a part of this period.

<Variations of Linkage Mechanism>

Figure 12:
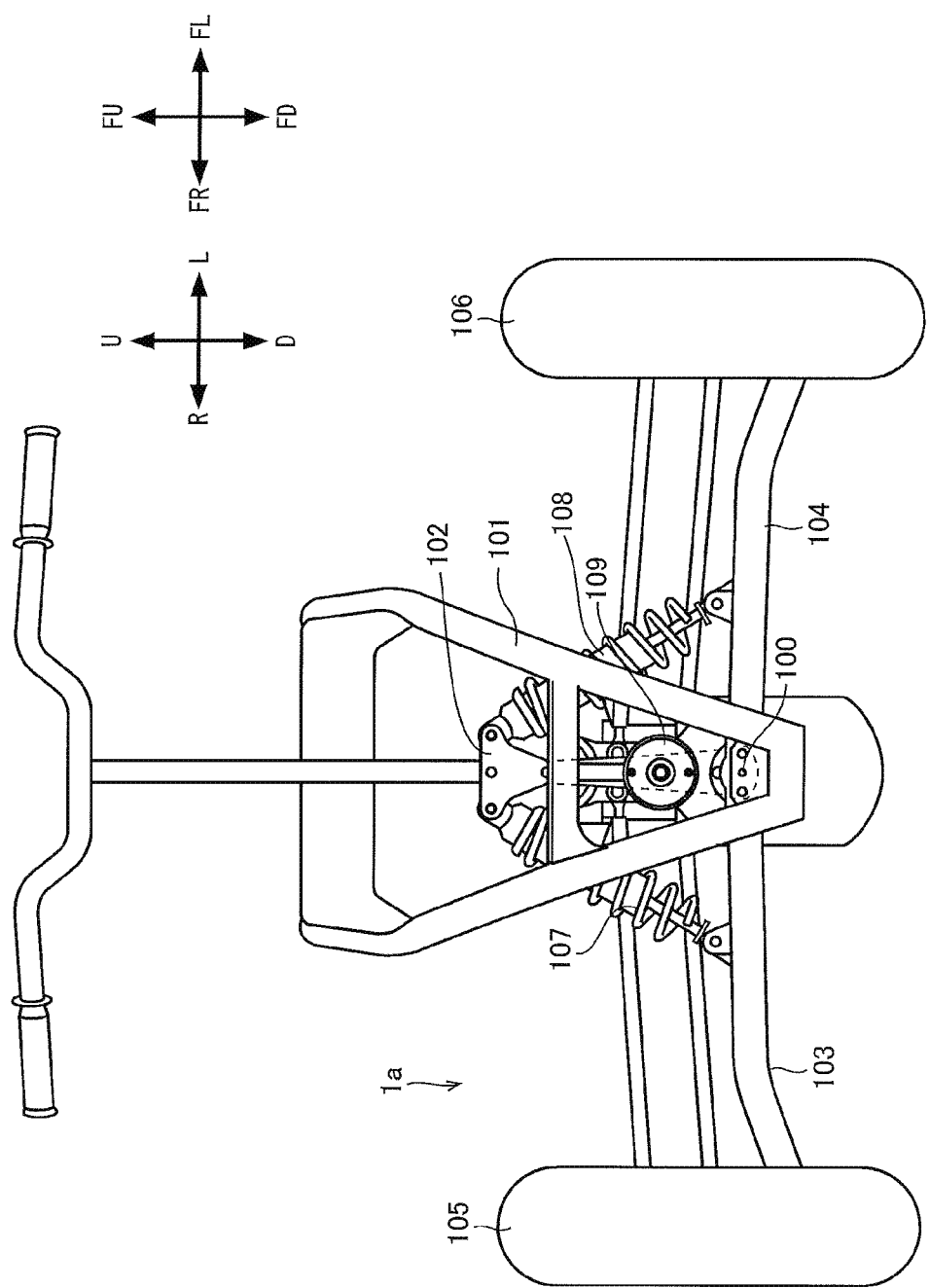
FIG. 12 is a view illustrating a variation of a linkage mechanism.

The configuration of the linkage mechanism 5 is not limited to the parallelogram linkage illustrated in FIG. 2. The linkage mechanism may include a shock tower as an arm that rotates with respect to the body frame, for example. FIG. 12 is a view illustrating an example of the linkage mechanism including the shock tower. In the example illustrated in FIG. 12, a shock tower 102 is attached to the body frame 101 to be rotatable about the rotating shaft 100. The vehicle 1a includes a right suspension arm 103, a left suspension arm 104, a right suspension 107, and a left suspension 108. The right suspension arm 103 is rotatably connected to the body frame 101 at one end and is rotatably connected to a right wheel 105 at the other end. The left suspension arm 104 is rotatably connected to the body frame 101 at one end and is rotatably connected to the left wheel 106 at the other end. The right suspension 107 is rotatably connected to the right suspension arm 103 at one end and is rotatably connected to the shock tower 102 at the other end. The left suspension 108 is rotatably connected to the left suspension arm 104 at one end and is rotatably connected to the shock tower 102 at the other end. The actuator 109 adjusts rotation of the shock tower 102 with respect to the body frame 101.

Figure 13:
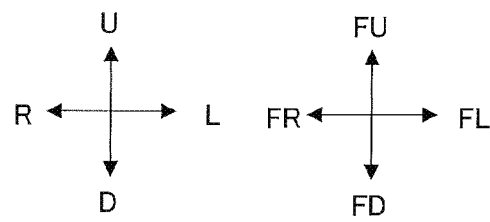
FIG. 13 is a view illustrating another variation of the linkage mechanism.
Figure 13:
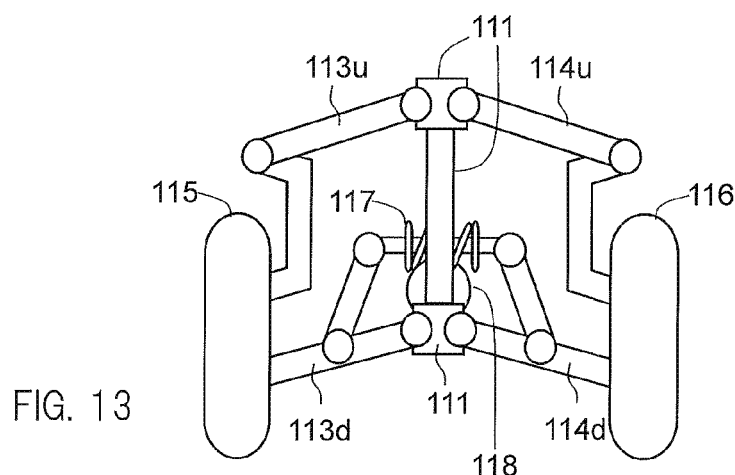

A configuration including no shock tower may also be employed. FIG. 13 is a view illustrating an example configuration of the linkage mechanism including no shock tower. In the example illustrated in FIG. 13, the linkage mechanism includes, as arms that rotate with respect to a body frame 111, a pair of right arms 113u and 113d rotatably connected to the body frame 111 at one end and rotatably connected to the right wheel 115 at the other end, and a pair of left arms 114u and 114d rotatably connected to the body frame 111 at one end and rotatably connected to the left wheel 116 at the other end. In this case, a suspension 117 is rotatably connected to the arm 113d of the pair of right arms at one end and is rotatably connected to the arm 114d of the pair of left arms at the other end. An actuator 118 applies a rotary force to the right arm 112d and the left arm 114d to thereby adjust rotation of the right arm 112d with respect to the body frame 111 and rotation of the left arm 114d with respect to the body frame 111. In the configuration illustrated in FIG. 13, the suspension 117 is also disposed between the right and left wheels 115 and 116 and the body frame 111.

Figure 14:
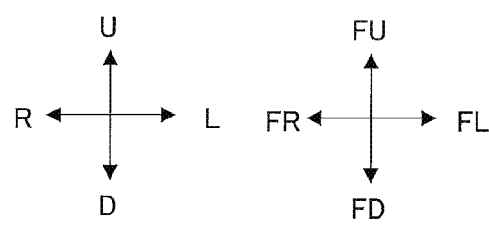
FIG. 14 is a view illustrating still another variation of the linkage mechanism.
Figure 14:
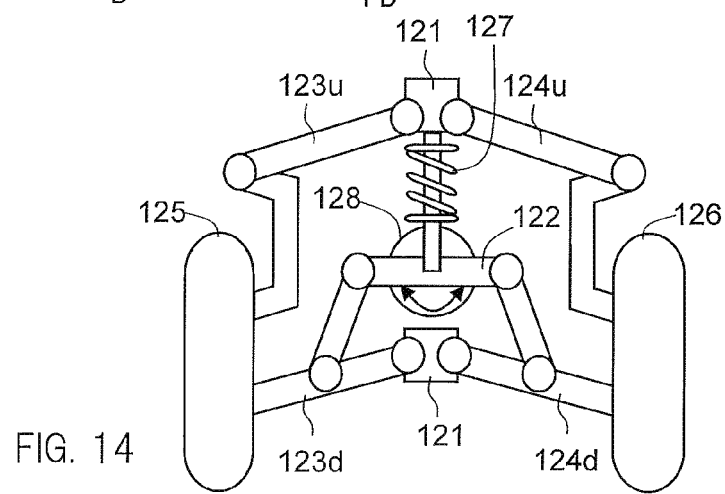

FIG. 14 is a view illustrating another variation of the linkage mechanism. The linkage mechanism illustrated in FIG. 14 includes a pair of right arms 123d and 123u connecting a body frame 121 and a right wheel 125 to each other and a pair of left arms 124d and 124u connecting the body frame 121 and a left wheel 126 to each other. A balancer arm 122 is rotatably connected between the right arm 123*d* of the pair of right arms and the left arm 124*d* of the pair of left arms. The balancer arm 122 rotatably bridges over the body frame 121 with a suspension 127 interposed therebetween. An actuator 128 applies a rotary force to the balancer arm 122 to thereby adjust rotation of the balancer arm 122 with respect to the body frame 121.

In the example described above, the rotation axes of the arms of the linkage mechanism extend in the front-rear direction of the vehicle. Alternatively, the rotation axes of the arms of the linkage mechanism may extend in the left-right direction of the vehicle. As such a variation, the linkage mechanism includes a right arm supporting the right wheel and a left arm supporting the left wheel. The right arm and the left arm are formed to extend in the front-rear direction of the vehicle. The right arm and the left arm rotate within a plane perpendicular to the left-right axis of the vehicle. That is, the axes of rotations of the right arm and the left arm with respect to the body frame are in the left-right direction of the vehicle. One end of the right arm is rotatably supported by the body frame. The other end of the right arm supports the right wheel so that the right wheel is rotatable about an axle. One end of the left arm is rotatably supported by the body frame. The other end of the left arm supports the left wheel so that the left wheel is rotatable about an axle. In this case, the left-right tilt angle control mechanism includes an actuator for adjusting the rotations of the right arm and the left arm with respect to the body frame.

<Other Variations>

In the embodiment described above, the steering force transfer mechanism 6 is configured to transfer rotation of the handlebar 23 to the right wheel 31 and the left wheel 32. That is, although the steering force transfer mechanism 6 is configured to transfer rotation of the handlebar 23 to the front wheels, the steering force transfer mechanism 6 may be configured to transfer rotation of the handlebar 23 to the rear wheel. In the embodiment described above, the front wheels are the right wheel 31 and the left wheel 32 arranged in the left-right direction, but the vehicle 1 may be configured such that the right wheel 31 and the left wheel 32 are rear wheels.

For example, in a case where the right wheel 31 and the left wheel 32 are rear wheels, the steering force transfer mechanism 6 may be configured to transfer rotation of the handlebar to a front wheel disposed ahead of the right wheel 31 and the left wheel 32, and may be also configured to transfer rotation of the handlebar to the right wheel 31 and the left wheel 32 that are rear wheels. The wheel disposed ahead of or behind the right wheel 31 and the left wheel 32 (the rear wheel 4 in the above example) is not limited to one wheel, and may be two wheels.

An actuator of a left-right tilt angle control mechanism in a leaning vehicle according to present teaching adjusts rotation of an arm with respect to a body frame. This actuator supplies at least one of a force for rotating the arm with respect to the body frame or a force against rotation of the arm with respect to the body frame. The left-right tilt angle control mechanism may be configured to include, for example, the actuator that has a part connected to the body frame and a part connected to the arm and applies a force for moving these parts relative to each other.

A period in which the left-right tilt angle control mechanism performs tilt angle control is a period in which a force of the actuator acts on rotation of the arm with respect to the body frame. The force of the actuator may act as a force against rotation of the arm in some cases or may act as a force for rotating the arm in other cases.

A control section according to an embodiment of the present teaching controls execution of tilt angle control by the left-right tilt angle control mechanism in the left-right direction of the body frame and cancellation of execution of the tilt angle control. In a state where the tilt angle is controlled by the left-right tilt angle control mechanism, the actuator acts on rotation of the arm. That is, rotation of the arm with respect to the body frame is controlled by the actuator. In a state where the tilt angle control by the left-right tilt angle control mechanism is canceled, the actuator does not act on rotation of the arm. That is, rotation of the arm with respect to the body frame is not affected by the actuator.

In the embodiment described above, the control section causes the roll angle control mechanism to control a roll angle in a low-speed traveling range. The roll angle control mechanism (left-right tilt angle control mechanism) may control a roll angle of the body frame (a tilt in the left direction or in the right direction) in a region except the low-speed traveling range (i.e., a high-speed traveling range).

The leaning vehicle according to the present teaching may include a tilt lock mechanism that prevents the body frame from tilting in the left direction or in the right direction, in addition to the left-right tilt angle control mechanism.

The control section cancels control of a tilt angle by the left-right tilt angle control mechanism in accordance with a change in the vehicle state caused by at least one of a rider's intention of causing the leaning vehicle to travel (vehicle travel intention) or a rider's intention of canceling tilt angle control by the left-right tilt angle control mechanism (left-right tilt angle control cancellation intention). The control section detects a change in the vehicle state by acquiring a signal or data indicating an operation of a rider or a signal or data from a sensor mounted on the vehicle. The control section determines whether or not the detected change in the vehicle state is caused by the rider's vehicle travel intention or the left-right tilt angle control cancellation intention. This determination may be made by, for example, determining whether the detected change in the vehicle state satisfies a predetermined condition or not. If the detected change in the vehicle state is caused by the rider's vehicle travel intention or the left-right tilt angle control cancellation intention, the control section cancels control of the tilt angle by the left-right tilt angle control mechanism.

The control section cancels suppression of motion of a buffer device in accordance with the change in the vehicle state caused by at least one of a rider's intention of causing the leaning vehicle to travel (vehicle travel intention) or an intention of canceling suppression of motion of the buffer device (buffer suppression cancellation intention). The control section detects a change in the vehicle state by acquiring a signal or data indicating an operation of a rider or a signal or data from a sensor mounted on the vehicle. The control section determines whether or not the detected change in the vehicle state is caused by the rider's vehicle travel intention or the buffer suppression cancellation intention. This determination may be made by, for example, determining whether the detected change in the vehicle state satisfies a predetermined condition or not. If the detected vehicle state is caused by the rider's vehicle travel intention or the buffer suppression cancellation intention, the control section cancels suppression of motion of the buffer device.

The control section detects an input of an instruction for canceling suppression of the buffer device by the rider (e.g., an operation of, for example, a button, a lever, or a switch by the rider) to thereby acquire information indicating the intention of canceling suppression of motion of the buffer device. The control section detects an input of an instruction for canceling left-right tilt angle control by the rider (e.g., an operation of, for example, the button, the lever, or the switch by the rider) to thereby acquire information indicating the intention of canceling left-right tilt angle control of the body frame.

The control section controls a state where the buffer control mechanism suppresses motion of the buffer device and a state where the buffer control mechanism cancels suppression of motion of the buffer device. In the state where the buffer control mechanism suppresses motion of the buffer device, motion of the buffer device is suppressed more greatly than in the state where suppression of motion of the buffer device is canceled. As an example, the state where motion of the buffer device is locked may be a state where motion of the buffer device is suppressed, and a state where the lock of motion of the buffer device is canceled may be a state where suppression of motion of the buffer device is canceled. As another example, in the state where motion of the buffer device is suppressed, the buffer control mechanism may more greatly suppress motion of the buffer device than in the state where suppression of motion of the buffer device is canceled.

The linkage mechanism is disposed between the body frame and each of the right wheel and the left wheel. This means that the linkage mechanism is on a force transfer path between the body frame and the right wheel and on a force transfer path between the body frame and the left wheel. Thus, space where the linkage mechanism may be placed is not limited to space disposed between the body frame and the right wheel and space disposed between the body frame and the left wheel.

The body frame is a member that receives stress on the leaning vehicle during traveling. Examples of the body frame include monocoque (stressed-skin structure), semi-monocoque, and a structure in which a vehicle part also serves as a member that receives stress. For example, a part such as an engine or an air cleaner may be a part of the body frame.

The buffer device buffers motion of the right wheel and the left wheel with respect to the body frame. The buffer device is disposed between the body frame and each of the right wheel and the left wheel. This means that the buffer device is on a force transfer path between the body frame and the right wheel and on a force transfer path between the body frame and the left wheel. Thus, space where the buffer device may be placed is not limited to space disposed between the body frame and the right wheel and space disposed between the body frame and the left wheel.

The buffer device is not limited to the configuration that buffers motion of the right wheel and the left wheel with respect to the body frame by extension and contraction of the buffer device. For example, the buffer device may be configured to include a rotating part having one end supporting the right wheel or the left wheel in such a manner that the right wheel or the left wheel is rotatable about an axle and another end supported on the body frame in such a manner that the other end is rotatable about a rotating shaft parallel to the axis. In this case, the buffer device further includes a damper part for suppressing rotation of the rotating part. For example, the buffer device includes an oil chamber charged with oil for suppressing rotation of the rotating part with respect to the body frame. The oil chamber is fixed to the body frame. The rotating part includes a vane radially extending from the rotating shaft. The vane is attached to be rotatable in the oil chamber. The buffer control mechanism controls the flow rate of oil with the vane in the oil chamber to thereby suppress motion of the buffer device and cancel the suppression.

In the embodiment described above, in the low-speed traveling range, after suppression of extension and contraction of the suspensions starts, control of the roll angle by the roll angle control mechanism starts. After the control of the roll angle is canceled, the suppression of extension and contraction of the suspensions is canceled. The timing of tilt angle control by the roll angle control mechanism (left-right tilt angle control mechanism) and the timing of suppression of extension and contraction of the suspensions (suppression of motion of the buffer device) by the suspension control mechanism (buffer control mechanism) are not limited to the examples described above.

For example, after control of a tilt angle of the body frame in the left direction or in the right direction starts, suppression of motion of the buffer device may start. These processes may start at the same time. After suppression of motion of the buffer device is canceled, control of the tilt angle of the body frame in the left direction or in the right direction may be canceled. These processes may be canceled at the same time. That is, control of the tilt angle of the body frame may start after suppression of motion of the buffer device and may be canceled after cancellation of suppression of motion of the buffer device. Alternatively, control of the tilt angle of the body frame may start after suppression of motion of the buffer device and may be canceled before cancellation of suppression of motion of the buffer device. Alternatively, control of the tilt angle of the body frame may start before suppression of motion of the buffer device and may be canceled after cancellation of suppression of motion of the buffer device. Alternatively, control of the tilt angle of the body frame may start before suppression of motion of the buffer device and may be canceled before cancellation of suppression of motion of the buffer device.

Suppression of motion of the buffer device may start before control of the tilt angle of the body frame in the left direction or in the right direction starts. In this case, the responsiveness of motion of a tilt of the body frame in the left direction or in the right direction with respect to a force of the actuator may be enhanced. Consequently, a change in the tilt of the body frame in the left direction or in the right direction may be converged.

In the embodiment described above, the control section continues roll angle control of the body frame (tilt angle control) and suppression of extension and contraction of the suspensions (suppression of motion of the buffer device) from before stop of the vehicle to the middle of the stop of the vehicle. As another control example, the control section may cancel control of the tilt angle of the body frame and suppression of motion of the buffer device at the stop of the vehicle or while the vehicle is stopped.

The control section performs control of the tilt angle of the body frame in the left direction or in the right direction and suppression of motion of the buffer device in a part or the whole of the low-speed traveling range. A speed range where the vehicle speed is lowest among a plurality of speed ranges obtained by dividing the entire vehicle-speed range (except for a range where vehicle speed=0) is the low-speed traveling range. In the embodiment described above, in a low-speed portion (speed range adjacent to the range where vehicle speed=0) in the low-speed traveling range, the roll angle control and the suppression of extension and contraction of the suspensions are performed. On the other hand, in a speed range not adjacent to the range where vehicle speed=0 in the low-speed traveling range, the roll angle control (tilt angle control) and the suppression of extension and contraction of the suspensions (buffer device motion suppression) may be performed. The speed range not adjacent to the range where vehicle speed=0 in the low-speed traveling range is an intermediate portion of the low-speed traveling range or a high-speed portion of the low-speed traveling range (a portion including the upper limit of the low-speed traveling range).

In the embodiment described above, the control section updates a target value of the tilt angle of the body frame in the left direction or in the right direction in accordance with an input to the leaning vehicle by the rider. Alternatively, the target value may be a fixed value. For example, the control section may control the left-right tilt angle control mechanism in such a manner that the body frame is in the upright position while the leaning vehicle is traveling in the low-speed traveling range.

Some illustrated embodiments of the present teaching have been described here. The present teaching should not be limited to these preferred embodiments. The present teaching encompasses every embodiment including equivalent elements, modifications, deletions, combinations (e.g., combinations of features across the embodiments), improvements, and/or changes, conceivable by those skilled in the art based on this disclosure. Limitations of claims should be broadly interpreted based on terms used in the claims, and should not be limited to embodiments in this specification and added in the prosecution of this application. Such embodiments should be regarded as nonexclusive.

What is claimed is:

1. A leaning vehicle comprising:
a body frame that tilts rightward when turning rightward in a left-right direction of the leaning vehicle, and tilts leftward when turning leftward in the left-right direction of the leaning vehicle;
a right wheel and a left wheel that are arranged in a left-right direction of the body frame;
a linkage mechanism including an arm rotatably supported on the body frame, the linkage mechanism being configured to change relative positions of the right wheel and the left wheel relative to the body frame in a top-bottom direction of the leaning vehicle and tilt the body frame in a left direction of the leaning vehicle or in a right direction of the leaning vehicle by rotating the arm with respect to the body frame;
a buffer device that buffers motion of the right wheel and the left wheel with respect to the body frame;
a left-right tilt angle control mechanism including an actuator that adjusts rotation of the arm with respect to the body frame, the left-right tilt angle control mechanism being configured to control a tilt angle of the body frame in the left direction of the leaning vehicle or in the right direction of the leaning vehicle;
a buffer control mechanism including an actuator for suppressing extension and contraction of the buffer device, capable of suppressing motion of the buffer device and canceling suppression of the motion; and
a control section that controls the left-right tilt angle control mechanism and the buffer control mechanism based on information on at least a vehicle speed of the leaning vehicle, wherein
the left-right tilt angle control mechanism and the buffer control mechanism operate independently of each other;
the left-right tilt angle control mechanism is configured to control the tilt angle of the body frame without suppressing the extension and contraction of the buffer device by the buffer control mechanism; and
the control section performs control of the buffer control mechanism at least partly by causing the buffer control mechanism to suppress motion of the buffer device in a period in which the vehicle speed of the leaning vehicle is at least in a part of a low-speed traveling range of an entire vehicle speed range of the leaning vehicle, and in at least a part of a period in which the left-right tilt angle control mechanism controls the tilt angle, and the entire vehicle speed range excludes a stop state of the leaning vehicle and is divided into the low-speed traveling range and a high-speed traveling range.

2. The leaning vehicle according to claim 1, wherein the control section continues control of suppressing the motion of the buffer device by the buffer control mechanism until the leaning vehicle stops.

3. The leaning vehicle according to claim 2, wherein the control section still continues the control of suppressing the motion of the buffer device by the buffer control mechanism while the leaning vehicle is stopped.

4. The leaning vehicle according to claim 3, wherein the control section cancels suppression of the motion of the buffer device by the buffer control mechanism after the leaning vehicle starts traveling.

5. The leaning vehicle according to claim 1, wherein the control section cancels suppression of the motion of the buffer device by the buffer control mechanism based on information on at least one of a rider's intention of causing the leaning vehicle to travel or a rider's intention of canceling suppression of the motion of the buffer device.

6. The leaning vehicle according to claim 1, wherein the control section continues control of the tilt angle by the left-right tilt angle control mechanism until the leaning vehicle stops.

7. The leaning vehicle according to claim 6, wherein the control section still continues the control of the tilt angle by the left-right tilt angle control mechanism while the leaning vehicle is stopped.

8. The leaning vehicle according to claim 7, wherein the control section cancels the control of the tilt angle by the left-right tilt angle control mechanism after the leaning vehicle starts traveling.

9. The leaning vehicle according to claim 1, wherein the control of the tilt angle by the left-right tilt angle control mechanism is canceled based on information on at least one of a rider's intention of causing the leaning vehicle to travel or a rider's intention of canceling control of the tilt angle by the left-right tilt angle control mechanism.

10. The leaning vehicle according to claim 5 or 9, wherein the control section acquires the information on the rider's intention of causing the leaning vehicle to travel by detecting at least one of an increase in a throttle opening degree, a decrease in a manipulated variable of a brake or cancellation of a brake operation, an increase in a vehicle speed, or an increase in an acceleration in a front direction of the vehicle or in a rear direction of the vehicle.

11. The leaning vehicle according to claim 1, wherein the actuator of the left-right tilt angle control mechanism applies a force against rotation of the arm with respect to the body frame.

12. The leaning vehicle according to claim 1, wherein the actuator of the left-right tilt angle control mechanism
  applies a force for rotating the arm with respect to the body frame.

13. The leaning vehicle according to claim 1, wherein the actuator of the left-right tilt angle control mechanism
  is provided independently of the buffer control mechanism.

* * * * *